US007500011B2

(12) United States Patent
Glaser et al.

(10) Patent No.: US 7,500,011 B2
(45) Date of Patent: Mar. 3, 2009

(54) AUDIO-ON-DEMAND COMMUNICATION SYSTEM

(75) Inventors: Robert D. Glaser, Seattle, WA (US); Mark O'Brien, Cambridge, MA (US); Thomas B. Boutell, Seattle, WA (US); Randy Glen Goldberg, Princeton, NJ (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 11/422,305

(22) Filed: Jun. 5, 2006

(65) Prior Publication Data

US 2006/0271989 A1 Nov. 30, 2006

Related U.S. Application Data

(63) Continuation of application No. 09/568,525, filed on May 9, 2000, which is a continuation of application No. 09/042,172, filed on Mar. 13, 1998, now Pat. No. 6,151,634, which is a continuation of application No. 08/347,582, filed on Nov. 30, 1994, now Pat. No. 5,793,980.

(51) Int. Cl.
*G06F 15/16* (2006.01)

(52) U.S. Cl. .................. 709/236; 348/14.1; 348/14.16; 370/412; 370/413; 370/415; 370/417; 370/428

(58) Field of Classification Search ..... 348/14.1–14.16; 370/412, 413, 415, 417, 428
See application file for complete search history.

(56) References Cited

U.S. PATENT DOCUMENTS 3,882,538 A 5/1975 Lowe (Continued)

FOREIGN PATENT DOCUMENTS

EP 309298 9/1988

(Continued)

OTHER PUBLICATIONS

PCT International Search Report dated Apr. 25, 1996; International Application No. PCT/US95/14765.

(Continued)

*Primary Examiner*—Kenny S Lin
*Assistant Examiner*—Tauqir Hussain
(74) *Attorney, Agent, or Firm*—Kory D. Christensen; Stoel Rives LLP

(57) ABSTRACT

An audio-on-demand communication system provides real-time playback of audio data transferred via telephone lines or other communication links. One or more audio servers include memory banks which store compressed audio data. At the request of a user at a subscriber PC, an audio server transmits the compressed audio data over the communication link to the subscriber PC. The subscriber PC receives and decompresses the transmitted audio data in less than real-time using only the processing power of the CPU within the subscriber PC. According to one aspect of the present invention, high quality audio data compressed according to lossless compression techniques is transmitted together with normal quality audio data. According to another aspect of the present invention, metadata, or extra data, such as text, captions, still images, etc., is transmitted with audio data and is simultaneously displayed with corresponding audio data. The audio-on-demand system also provides a table of contents indicating significant divisions in the audio clip to be played and allows the user immediate access to audio data at the listed divisions. According to a further aspect of the present invention, servers and subscriber PCs are dynamically allocated based upon geographic location to provide the highest possible quality in the communication link.

51 Claims, 17 Drawing Sheets

U.S. PATENT DOCUMENTS

| | | | | | |
|---|---|---|---|---|---|
| 3,887,763 | A | | 6/1975 | Hinoshita et al. | |
| 3,990,710 | A | | 11/1976 | Hughes | |
| 4,124,773 | A | | 11/1978 | Elkins | |
| 4,224,644 | A | | 9/1980 | Lewis et al. | |
| 4,253,157 | A | | 2/1981 | Kirschner et al. | |
| 4,504,705 | A | | 3/1985 | Pilloud | |
| 4,506,387 | A | | 3/1985 | Walter | |
| 4,581,484 | A | | 4/1986 | Bendig | |
| 4,611,277 | A | | 9/1986 | Kemppainen et al. | |
| 4,626,824 | A | * | 12/1986 | Larson | 341/95 |
| 4,658,093 | A | | 4/1987 | Hellman | |
| 4,727,422 | A | | 2/1988 | Hinman | |
| 4,758,881 | A | * | 7/1988 | Laspada | 348/560 |
| 4,827,256 | A | | 5/1989 | Yokoyama | |
| 4,845,756 | A | | 7/1989 | Seen et al. | |
| 4,849,817 | A | | 7/1989 | Short | |
| 4,899,299 | A | | 2/1990 | MacPhail | |
| 4,905,094 | A | | 2/1990 | Pocock et al. | |
| 4,920,432 | A | | 4/1990 | Eggers et al. | |
| 4,924,303 | A | | 5/1990 | Brandon et al. | |
| 4,941,123 | A | | 7/1990 | Thompson | |
| 4,949,187 | A | | 8/1990 | Cohen | |
| 4,963,995 | A | | 10/1990 | Lang | |
| 4,975,691 | A | | 12/1990 | Lee | |
| 4,987,529 | A | | 1/1991 | Craft et al. | |
| 4,999,806 | A | | 3/1991 | Chernow et al. | |
| 5,001,580 | A | | 3/1991 | Aranovsky et al. | |
| 5,041,921 | A | | 8/1991 | Scheffler | |
| 5,051,822 | A | | 9/1991 | Rhoades | |
| 5,057,932 | A | | 10/1991 | Lang | |
| 5,109,482 | A | | 4/1992 | Bohrman | |
| 5,130,792 | A | | 7/1992 | Tindell et al. | |
| 5,132,992 | A | | 7/1992 | Yurt et al. | |
| 5,164,839 | A | | 11/1992 | Lang | |
| 5,191,573 | A | | 3/1993 | Hair | |
| 5,195,092 | A | | 3/1993 | Wilson et al. | |
| 5,237,157 | A | | 8/1993 | Kaplan | |
| 5,237,322 | A | | 8/1993 | Heberle | |
| 5,247,347 | A | | 9/1993 | Litteral et al. | |
| 5,253,341 | A | | 10/1993 | Rozmanith et al. | |
| 5,255,369 | A | * | 10/1993 | Dann | 709/214 |
| 5,262,875 | A | | 11/1993 | Mincer et al. | |
| 5,282,028 | A | | 1/1994 | Johnson et al. | |
| 5,283,819 | A | | 2/1994 | Glick et al. | |
| 5,289,545 | A | | 2/1994 | Jestice | |
| 5,297,249 | A | | 3/1994 | Bernstein et al. | |
| 5,365,552 | A | * | 11/1994 | Astle | 375/354 |
| 5,367,341 | A | * | 11/1994 | Schnorf | 348/616 |
| 5,373,288 | A | | 12/1994 | Blahut | |
| 5,375,068 | A | * | 12/1994 | Palmer et al. | 709/204 |
| 5,416,831 | A | | 5/1995 | Chewing, III et al. | |
| 5,434,852 | A | | 7/1995 | La Porta et al. | |
| 5,440,334 | A | | 8/1995 | Walters et al. | |
| 5,442,389 | A | | 8/1995 | Blahut et al. | |
| 5,442,637 | A | * | 8/1995 | Nguyen | 714/708 |
| 5,477,542 | A | * | 12/1995 | Takahara et al. | 370/389 |
| 5,497,502 | A | | 3/1996 | Castille | |
| 5,508,731 | A | | 4/1996 | Kohorn | |
| 5,534,944 | A | * | 7/1996 | Egawa et al. | 348/584 |
| 5,537,409 | A | | 7/1996 | Moriyama et al. | |
| 5,539,449 | A | | 7/1996 | Blahut et al. | |
| 5,542,087 | A | | 7/1996 | Neimat et al. | |
| 5,561,456 | A | | 10/1996 | Yu | |
| 5,561,670 | A | | 10/1996 | Hoffert | |
| 5,566,175 | A | * | 10/1996 | Davis | 370/468 |
| 5,572,442 | A | | 11/1996 | Schulhof et al. | |
| 5,583,994 | A | | 12/1996 | Rangan | |
| 5,592,472 | A | * | 1/1997 | Grant et al. | 370/351 |
| 5,611,038 | A | | 3/1997 | Shaw et al. | |
| 5,612,742 | A | | 3/1997 | Krause et al. | |
| 5,621,890 | A | * | 4/1997 | Notarianni et al. | 710/303 |
| 5,623,471 | A | * | 4/1997 | Prigge | 369/84 |
| 5,623,690 | A | | 4/1997 | Palmer et al. | |
| 5,623,699 | A | | 4/1997 | Blakeslee | |
| 5,625,404 | A | | 4/1997 | Grady et al. | |
| 5,629,732 | A | | 5/1997 | Moskowitz et al. | |
| 5,631,903 | A | | 5/1997 | Dianda et al. | |
| 5,635,979 | A | | 6/1997 | Kostreski et al. | |
| 5,638,426 | A | * | 6/1997 | Lewis | 379/90.01 |
| 5,642,151 | A | | 6/1997 | Nusbickel et al. | |
| 5,666,291 | A | | 9/1997 | Scott et al. | |
| 5,682,325 | A | | 10/1997 | Lightfoot et al. | |
| 5,701,465 | A | * | 12/1997 | Baugher et al. | 707/10 |
| 5,734,719 | A | | 3/1998 | Tsevdos et al. | |
| 5,754,784 | A | | 5/1998 | Garland et al. | |
| 5,761,417 | A | * | 6/1998 | Henley et al. | 709/231 |
| 5,790,176 | A | | 8/1998 | Craig | |
| 5,793,980 | A | | 8/1998 | Glaser et al. | |
| 5,794,217 | A | | 8/1998 | Allen | |
| 5,822,537 | A | * | 10/1998 | Katseff et al. | 709/231 |
| 5,835,667 | A | | 11/1998 | Wactlar et al. | |
| 5,848,234 | A | | 12/1998 | Chernick et al. | |
| 5,870,552 | A | | 2/1999 | Dozier et al. | |
| 5,877,755 | A | | 3/1999 | Hellhake | |
| 5,889,549 | A | * | 3/1999 | Yasuda et al. | 348/14.01 |
| 5,915,094 | A | | 6/1999 | Kouloheris et al. | |
| 5,917,835 | A | | 6/1999 | Barrett et al. | |
| 5,951,646 | A | | 9/1999 | Brandon | |
| 5,963,916 | A | | 10/1999 | Kaplan | |
| 5,969,827 | A | | 10/1999 | Shibata et al. | |
| 5,970,054 | A | | 10/1999 | Shibata et al. | |
| 5,978,567 | A | | 11/1999 | Rebane et al. | |
| 6,104,836 | A | * | 8/2000 | Buckley et al. | 382/236 |
| 6,151,634 | A | | 11/2000 | Glaser et al. | |
| 6,188,428 | B1 | | 2/2001 | Koz et al. | |
| 6,453,336 | B1 | | 9/2002 | Beyda et al. | |
| 6,604,144 | B1 | | 8/2003 | Anders | |
| 6,608,636 | B1 | * | 8/2003 | Roseman | 715/753 |
| 6,622,171 | B2 | | 9/2003 | Gupta et al. | |
| 6,714,723 | B2 | | 3/2004 | Abecassis | |
| 6,985,487 | B1 | * | 1/2006 | Kobayashi et al. | 370/395.1 |
| 2004/0153951 | A1 | | 8/2004 | Walker et al. | |
| 2004/0172478 | A1 | * | 9/2004 | Jacobs et al. | 709/233 |
| 2006/0200260 | A1 | * | 9/2006 | Hoffberg et al. | 700/86 |

FOREIGN PATENT DOCUMENTS

| | | |
|---|---|---|
| WO | WO93/16557 | 8/1993 |
| WO | WO94/14273 | 6/1994 |

OTHER PUBLICATIONS

PCT Written Opinion dated Nov. 14, 1996; International Application No. PCT/US95/14765.

C. Topolcic: "Experimental Internet Stream Protocol, Version 2 (ST-II)"; Internet Working Group Request for Comments RFC-1190, Oct. 1990.

Govindan R.; "Operating Systems Mechanisms for Continuous Media"; Theses, University of California, Berkeley, CA (1992).

Schulzrinne H. et al.; "Real-Time Streaming Protocol (RTSP)" RFC-2326; IETF Request for Comments (Apr. 1998).

Stephen J. Bigelow, Modern Communications Standards, Electronics Now, pp. 35-42, Sep. 1994.

NCSA Mosaic Version History, Jun. 1993.

Mosaic Quick Tour for Windows, Copyright 1994.

* cited by examiner

AUDIO-ON-DEMAND COMMUNICATION SYSTEM

CROSS-REFERENCE TO RELATED APPLICATIONS

The present application is a continuation of U.S. patent application Ser. No. 09/568,525 filed on May 9, 2000, which is a continuation of U.S. patent application Ser. No. 09/042,172 filed on Mar. 13, 1998 now U.S. Pat. No. 6,151,634, which is a continuation of U.S. patent application Ser. No. 08/347,582 filed on Nov. 30, 1994 now U.S. Pat. No. 5,793,980.

BACKGROUND OF THE INVENTION

1. Field of the Invention

The present invention relates to multimedia computer communication systems and, in particular, to communication systems which provide Audio-On-Demand services.

2. Description of the Related Art

In recent years, the computer industry has observed an increasing demand for versatility in the personal computer market. The average consumer is less interested in high computer performance such as increased memory and clock rates than in the everyday usefulness of a personal computer system. For example, parents may be interested in educational computer programs for their children which instruct using both visual and audio media. As a result, there has been an increasing demand for personal computers and computer networks which have multimedia capabilities.

Among the most desirable multimedia capabilities are those associated with the transmission of audio information. A number of uses have been contemplated for transmission of audio information. For example, a user may want access to music or news, or may want to have a book read to them over their computer. Also, transmission of audio data provides much needed access to valuable information for visually impaired persons. Such multimedia communication systems which provide subscribers with selectable audio information are commonly called audio-on-demand systems.

U.S. Pat. No. 5,132,992 issued to Yurt, et al., discloses an audio and video transmission and receiving system. The audio and video-on-demand system disclosed by Yurt, et al., distributes video and/or audio information to multiple subscriber units from a central source material library. Digital signal processing is used to compress data within the source material library so that such data can be transmitted over standard communication links such as a cable or satellite broadcast channel, or a standard telephone line to a receiver specified by subscriber service. The receiver subscriber unit includes a decompressor for decompressing data sent from the source materials library and playing back the decompressed data by means of an audio or visual display.

Although known audio-on-demand communication systems offer many significant benefits, such systems are still subject to a number of significant limitations. For instance, significant difficulties are encountered when attempting to provide real time audio playback over narrowband communication links such as a standard telephone line.

SUMMARY OF THE INVENTION

The present invention provides a real-time, audio-on-demand system which may be implemented using only the processing capabilities of the CPU within a conventional personal computer. As detailed above, a number of significant difficulties arise when attempting to provide real-time audio-on-demand. It has been found that these difficulties are exacerbated when the subscriber receiving unit is a conventional personal computer having an Intel 486 microprocessor, or processors of equivalent power, as a central processing unit. Of course, higher power processors could be used, but such systems would become prohibitively expensive and would not be available to the mainstream personal computer user. In order to compensate for lack of processing power, special hardware or other additional capabilities would be needed. The system of the present invention overcomes these difficulties so that real-time audio-on-demand is available to the average consumer on an unmodified personal computer.

In order to overcome the aforementioned difficulties, the system of the present invention employs an audio compression algorithm which provides audio compression on the order of 22:1. As is well known in the art, audio data in digitized format requires large amounts of memory space. It has been found that, in order to transmit digitized audio data so that a high quality audio signal is generated in real time, a data rate on the order of 22 kilobytes per second is typically necessary. However, current data rates achievable by most average cost modems on a reliable basis, fall in the range of 1.8 kilobytes (14.4 kilobits) per second. Consequently, the real-time, audio-on-demand system of the present invention provides a form of audio compression which allows digitized audio data to be transmitted over a conventional 14.4 kilobits per second modem connection. For purposes of practical implementation, it is preferable to use less than the maximum possible modem bandwidth when transmitting data. It has been found that very good performance can be obtained if the data transmission rate is about 1 kilobyte per second. Assuming a required data rate of 22 kilobytes per second and a transmission bandwidth of approximately 1 kilobyte per second, an audio compression of approximately 22 to 1 is required. Audio compression algorithms which may be used in accordance with the teachings of the present invention to provide audio compression on the order of 22:1 are well known in the art. The EIA/TIA IS-54 standard, which is herein incorporated by reference, discloses an algorithm description such that one of ordinary skill in the art could implement a compression algorithm suitable for use in the present invention. Advantageously, a preferred embodiment of the algorithm employs an adaptation of the IS-54 VSELP cellular compression algorithm compatible with the IS-54 VSELP cellular compression algorithm available from MOTOROLA. Of course, it should be understood that in order to facilitate the compression and transmission of digitized audio data, it may be advantageous to convert the compression algorithm from hexadecimal to binary (i.e., from ASCII data format to binary data format). Another preferred embodiment of the invention utilizes the code excited linear predication (CELP) coder, version 3.2, available from NTIS, U.S. Department of Commerce, 5285 Port Royal Rd., Springfield, Va., 22161 (telephone number 703-487-4650). Another preferred embodiment implements the well known GSM coding algorithm available through the European standards committee. Yet another preferred implementation uses a LPC-10 based coder described in a publication entitled "Digital Processing of Speech Signals," by L. R. Rabiner and R. W. Schafer, published by Prentice Hall, 1978. The aforementioned public documents are herein incorporated by reference.

Although the required data rates are achievable by means of the improved audio compression algorithm described above, certain difficulties are still inherent in a system which provides real time audio-on-demand without specialized software. Further difficulties are encountered in computer systems which run high power applications programs such as computer systems which run in a MICROSOFT WINDOWS environment. Specifically, it is still necessary to decompress and translate the audio data received into a format compatible with WINDOWS. This poses particular problems since a WINDOWS environment typically requires a great deal of processing power so that much of a CPU's time is spent in supporting the WINDOWS software. To overcome this difficulty, the system of the present invention continually monitors requests issued by application programs which run concurrently with the audio-on-demand system of the present invention. In this manner, requests issued by the applications programs are processed rather than ignored in the system of the present invention.

Furthermore, data buffers of reasonable size should be allocated within the dynamic random access memory (DRAM) of a conventional 486 Intel based personal computer in order to avoid deleterious effects on computer performance. Thus, typically, buffer memories are allocated within the DRAM to have on the order of approximately 16 or 32 kilobytes of storage. If digitized audio data is transmitted and received within the data buffer at too fast a rate, the buffers would overflow causing the loss of significant portions of data and audio dropout. As is well known in the art, audio dropout is a phenomena wherein audio playback terminates for some noticeable time period and then resumes after this delay. On the other hand, if data was transmitted too slowly, then the buffers would empty out again resulting in significant dropout and degradation of audio quality. Thus, a number of significant difficulties are encountered when attempting to implement a real time audio-on-demand system within a 486 CPU based personal computer system, or other similar personal computer systems. Thus, the present invention provides a method of monitoring and regulating the flow of data between the server and the subscriber unit which insures that the buffers are constantly maintained at or near maximum capacity.

In a further aspect of the invention, audio quality degradation may be compensated for through the data flow regulation of the present invention. This flow regulation constantly maintains the buffers at or near maximum capacity so that, in the event of a delay in the communication link, the subscriber unit can continue to play back audio already stored in the buffers until new audio data begins to arrive again. Also, the present invention employs a method of transmitting high quality audio data compressed using a lossless compression algorithm or a compression algorithm having a compression ratio which requires transmission at a rate greater than real time, at selected intervals so that brief passages of higher quality audio signals are produced at playback. In one embodiment, the user may select when a high quality passage is to be sent so that important pieces of audio data are played back clearly.

In another aspect of the invention increased control over received audio data is provided for by transmitting selected significant portions of an audio clip being transmitted in anticipation that the user may desire to move immediately to a new position in the audio clip.

In addition, versatility is added to the audio-on-demand system of the present invention by transmission of limited extra data, or "metadata," interleaved with the transmitted audio data. The metadata may include text, captions, still image data, high quality audio data, etc., and includes information so as to allow the subscriber to synchronize the metadata with significant events in the audio data. The metadata is correlated with the audio data to provide a combined audio and visual experience.

Furthermore, the present invention advantageously provides dynamic allocation of server/subscriber pairs to insure the best possible quality of communication links between the server and the subscriber.

DETAILED DESCRIPTION OF THE PREFERRED EMBODIMENT

Figure 1:
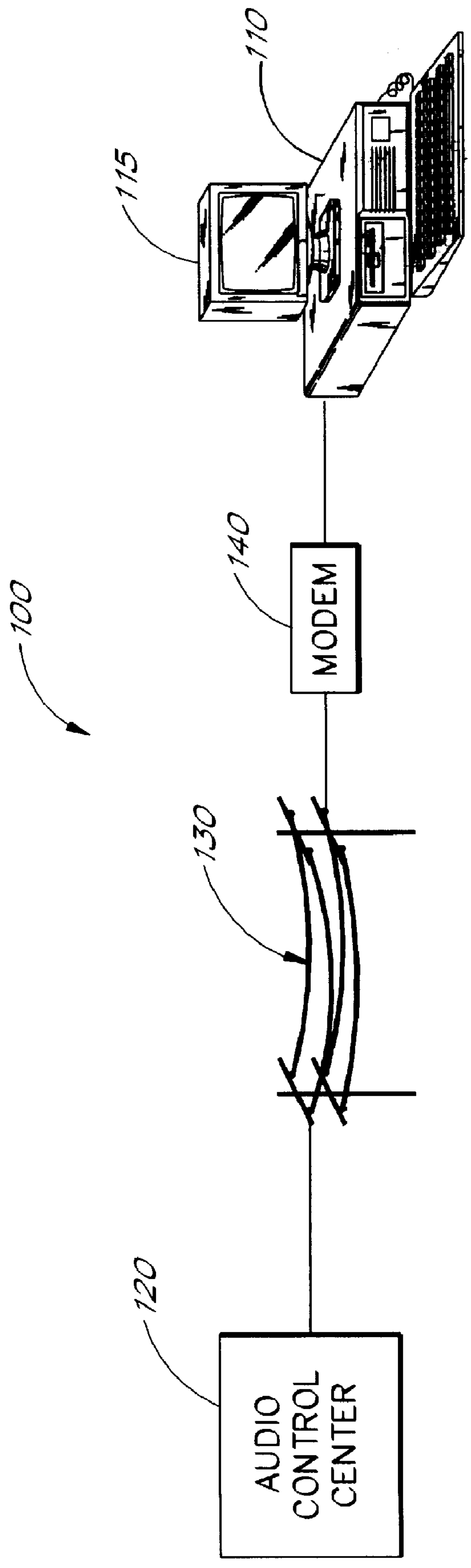
FIG. 1 shows a simplified schematic block diagram of an audio-on-demand system constructed in accordance with the present invention.

FIG. 1 shows a simplified schematic block diagram of an "audio-on-demand" system constructed in accordance with the present invention. The system 100 comprises a subscriber personal computer (PC) 110 (e.g., an IBM PC having a 486 Intel Microprocessor), having a video display 115. The subscriber PC 110 connects to an audio control center 120 over telephone lines 130 via a modem 140.

In operation, a user calls the audio control center 120 by means of the modem 140. The audio control center 120 transmits a menu of possible selections over the telephone lines 130 to the personal computer 110 for display on the video display 115. The user may then select one of the available options displayed on the video display 115 of the computer 110. For example, the user may opt to listen to a song or hear a book read. Once the audio data has been transmitted, the modem 140 disconnects from the audio control center 120.

FIGS. 2A-2D and FIG. 3 are schematic block diagrams which show, in greater detail, the main functional elements of the audio-on-demand system 100 of the present invention which provides a real time audio-on-demand system in conjunction with the subscriber PC 110 which comprises a standard microprocessor based personal computer system. In the context of the present invention, the term "standard" personal computer system should be understood to mean that the system includes a microprocessor of equivalent or greater processing power than an INTEL 486 microprocessor (although not necessarily compatible with an INTEL 486 microprocessor), a random access memory (RAM), an internal or external modem which transmits data in the approximate range of 9.6 Kbps to 14.4 Kbps, and some kind of sound card or sound chip which serves as a digital-to-analog convertor. Such a system is advantageously capable of running MICROSOFT WINDOWS software. Of course, it should be understood that a "standard" personal computer system should not be simply understood to be an IBM compatible computer. In practice any kind of workstation or personal computing system (e.g., a SUN MICROSYSTEMS workstation, an APPLE computer, a laptop computer, etc.) which includes the above described features may be understood to be broadly encompassed under the expression "standard" computer system.

Figure 2A:
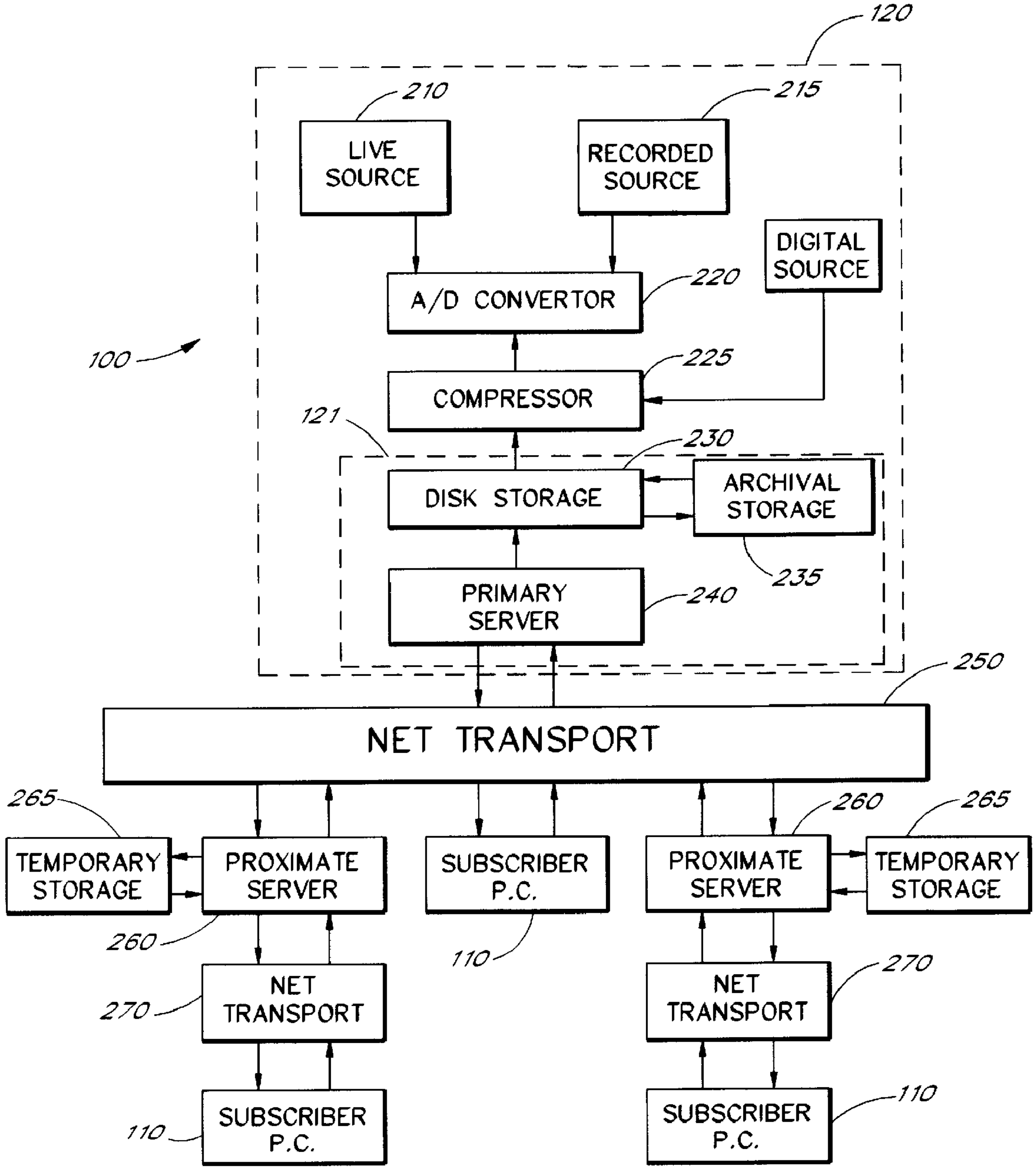
FIG. 2A is a more detailed schematic block diagram showing the main functional elements of the audio-on-demand system of the present invention.

A more detailed block diagram of the audio-on-demand system 100 of the present invention is depicted in FIG. 2A. The audio control center 120 is shown in FIG. 2A to comprise a live audio source 210 and a recorded audio source 215. In one embodiment, the live audio source may simply comprise a person talking into a microphone or some other source of live audio data like a baseball game, while the recorded audio source 215 may comprise a tape recorder, a compact disk, or any other source of recorded audio information. Both the live audio source 210 and the recorded audio source 215 serve as inputs to an analog-to-digital converter 220. The analog-to-digital converter 220 may, in one embodiment, comprise a Roland® RAP 10 analog-to-digital converter available with the Roland® audio production card. The analog-to-digital converter 220 provides inputs to a digital compressor 225. Of course, it should be understood that some audio data input into the audio control center 120 may already be in digital form, as represented by a digitized audio source 218, and, therefore, may be input directly into the digital compressor 225. The digital compressor 225 compresses the digitized audio data provided by the analog-to-digital converter 220 in accordance with the IS-54 standard compression algorithm. The compressor 225 provides inputs to a disk storage unit 230, which in turn communicates with an archival storage unit 235 via a bidirectional communication link. Finally, the disk storage unit 230 communicates with a primary server 240, which may, in one embodiment, advantageously comprise a UNIX server class work station such as those produced by SUN Microsystems. The disk storage unit 230, together with the archival storage unit 235 and the primary server 240 comprise an audio servicer 121, as indicated by a dashed box.

The audio control center 120 may communicate bidirectionally with a plurality of subscriber PCs 110 or a plurality of proximate servers 260 via a net transport 250. Each of the proximate servers 260 communicate with temporary storage units 265 via a bidirectional communication link. Finally, each of the proximate servers 260 communicate with subscriber PCs 110 via net transport communication links 270.

In operation, the analog-to-digital converter 220 receives either live or recorded audio data from the live source 210 or the recorded source 215, respectively. The analog-to-digital converter 220 then converts the received audio data into digital format and inputs the digitized audio data into the compressor 225. The compressor 225 then compresses the received audio data with a compression ratio of approximately 22:1 in one embodiment in accordance with the specifications of the IS-54 compression algorithm. The compressed audio data is then passed from the compressor 225 to the disk storage unit 230 and, in turn, to the archival storage unit 235. The disk storage unit 230, together with the archival storage unit 235, serve as audio libraries which can be accessed by the primary server 240. In one preferred embodiment, the disk storage unit 230 contains audio clips and other audio data which is expected to be referenced with high frequency, while the archival storage contains audio clips and other audio information which is expected to be referenced with lower frequency. The primary server 240 may also dynamically allocate the audio information stored within the disk storage unit 230, as well as the audio information stored within the archival storage unit 235, based upon a statistical analysis of the requested audio clips and other audio information. The primary server 240 responds to requests received by the multiple subscriber PCs 110 and the proximate servers 260 via the net transport 250. The operation of the primary server 240 as well as the proximate servers 260 will be described in greater detail below with reference to FIGS. 6A and 6B.

As will be described in greater detail below, the proximate servers 260 may be dynamically allocated to serve local subscriber PCs 110 based upon the geographic location of each of the subscribers accessing the audio-on-demand system 100. This ensures that a higher quality connection can be made between the proximate server 260 and the subscriber PCs 110 via net transports 270. Further, the temporary storage memory banks 265 of the proximate servers 260 are typically faster to access than the disk or archival storage 230, 235 associated with the primary server 240. Thus, the proximate servers 260 can typically provide faster access to requested audio clips.

Figure 2D:
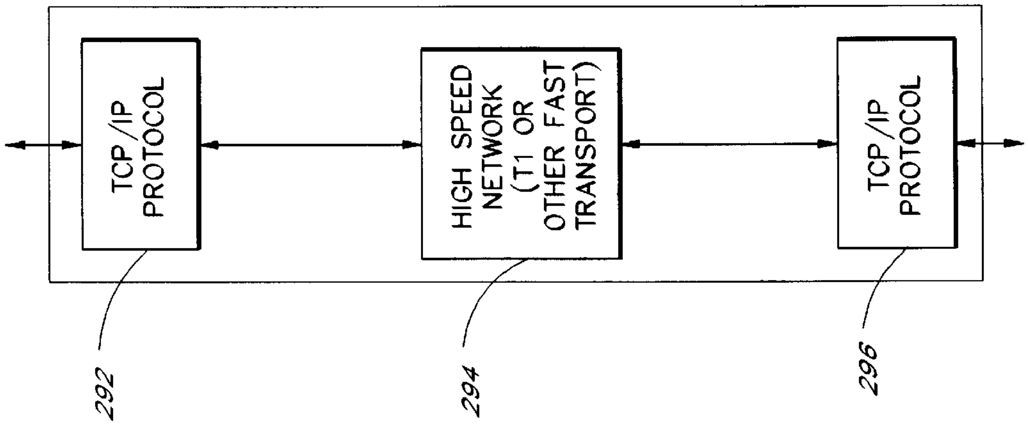
FIGS. 2B-2D are schematic block diagrams showing the main functional elements of alternate embodiments of the net transports depicted in FIG. 2A.
Figure 2C:
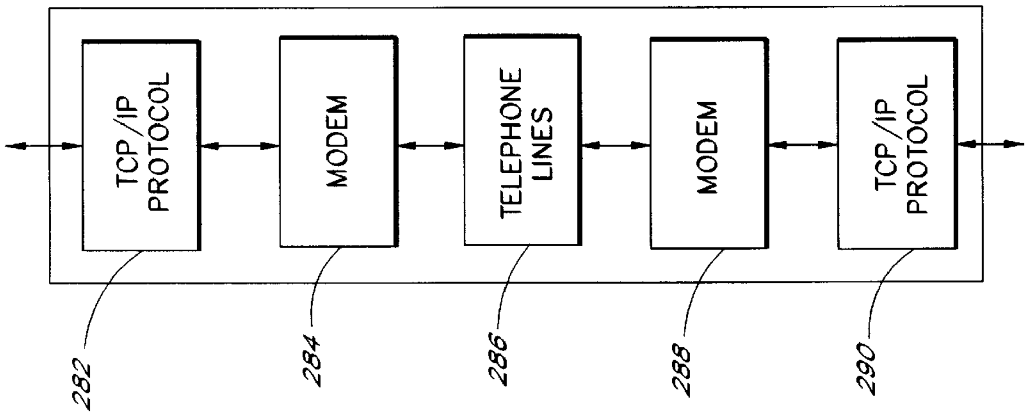
Figure 2B:
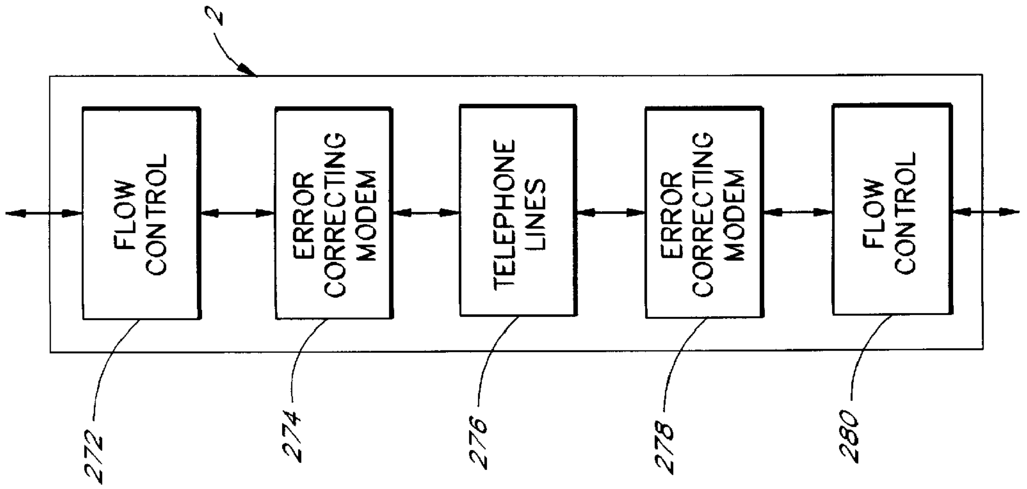

FIGS. 2B-2D depict various implementations of the net transport 250, 270. As depicted in FIG. 2B, the net transport 250, 270 comprises a flow controller 272, which communicates bidirectionally with an error correcting modem 274. The error correcting modem 274 communicates bidirectionally with an error correcting modem 278 via telephone lines 276. Finally, the error correcting modem 278 communicates with a flow controller 280.

In operation, the flow controllers 272, 280 are used to regulate the flow of data between the server (240 or 260) and the subscriber PC 110. As described in greater detail below with reference to FIG. 6A, the flow controllers 272, 280 may be implemented as software provided within the server (240 or 260) and subscriber PC 110. The embodiment of the net transport 250 shown in FIG. 2B is typically used in applications where the flow of data is not automatically regulated in accordance with the parameters of the communication link.

FIG. 2C depicts an alternative embodiment of the net transport 250, 270. The alternative embodiment comprises a Transmission Control Protocol/Internet Protocol (TCP/IP) protocol 282, which communicates bidirectionally with a modem 284. The modem 284 communicates bidirectionally with a modem 288 via telephone lines 286. Finally, the modem 288 communicates bidirectionally with a receiver and TCP/IP protocol 290.

In operation, the TCP/IP protocol 282, 290 is used to automatically regulate the flow of data between the server and the subscriber. In one embodiment, the TCP/IP protocol may be implemented as standard Chameleon software available from NETMANAGE, Inc. The embodiment of the net transport 270 depicted in FIG. 2C is typically used in applications involving an INTERNET link or other communication link where the flow of data is automatically regulated.

Finally, a further embodiment of the net transport 250, 270 is depicted in FIG. 2D. In FIG. 2D, the net transport 270 comprises a TCP/IP protocol 292, which communicates bidirectionally with a high-speed network 294. The high-speed network, in one embodiment, may comprise a T1 land line link or other fast transport communication link. The high-speed network 294 communicates bidirectionally with a TCP/IP protocol 296. The embodiment of the net transport 270 shown in FIG. 2D is typically used in applications involving an internet link or other communication link where the flow of data is automatically regulated.

Figure 3:
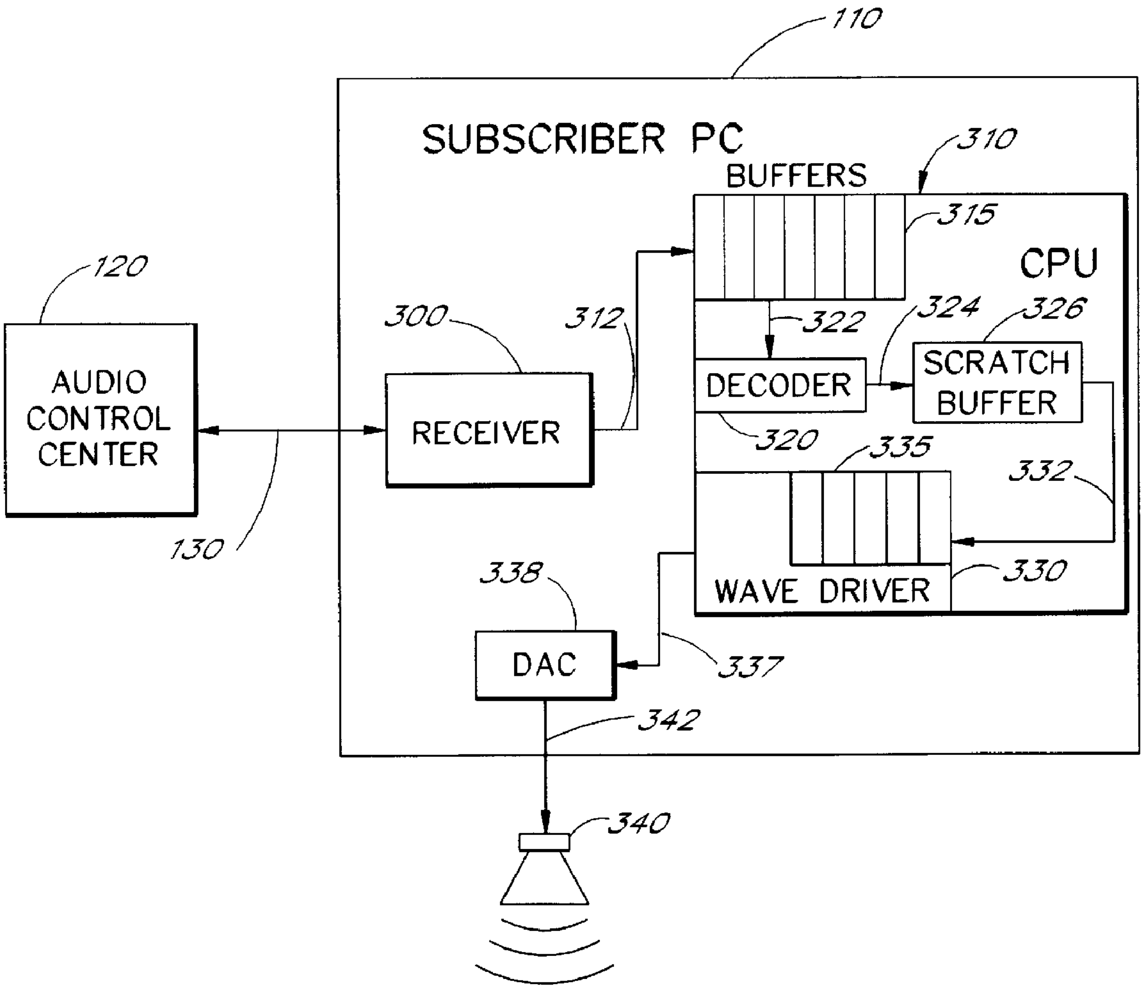
FIG. 3 is a schematic block diagram showing the main functional elements of a receiving subscriber audio unit such as a subscriber personal computer.

FIG. 3 is a schematic block diagram showing the main functional elements within the receiving personal computer 110. The telephone line 130 enters a receiver 300 which advantageously comprises an internal modem. Of course, it will be appreciated that if the receiver 300 is included internally within the subscriber PC 110 there is no need to include the modem 140 depicted in FIG. 1. The receiver 300 connects to a CPU module 310 via a line 312. As described herein, the CPU module 310 comprises a microprocessor such as an INTEL 486, as well as dynamic random access memory (DRAM) which may be allocated as buffer space. The CPU 310 is shown to include a buffer memory 315. The buffer memory 315 may, in one embodiment, comprise a portion of the DRAM allocated at initialization of the audio-on-demand system 100. The buffer 315 within the CPU 310 connects to a decoder 320 via a line 322. The decoder 320 connects to a scratch buffer 326 (which advantageously comprises a portion of the DRAM associated with the CPU 310) via a line 324. The scratch buffer 326 connects to a wave driver 330 via a line 332. The wave driver 330 is advantageously implemented as software provided by sound card vendors or provided by the MICROSOFT WINDOWS operating system run by the CPU 310. The wave driver 330 also includes a buffer memory 335 which may comprise another portion of the DRAM allocated at initialization. The wave driver 330 connects to a digital-to-analog convertor (DAC) 338 via a line 337. The DAC 338 advantageously is found on a SOUNDBLASTER sound board available from Creative Labs. The DAC 338 connects to an audio transducer 340, which advantageously comprises a speaker, via a line 342.

In general operation, the receiver 300 receives the transmitted data signals from the line 130 and demodulates these signals into digital data. The digital data is provided as inputs to the buffer's memory 315 within the CPU 310. At intervals selected by the CPU 310, the buffer 315 outputs the digitized audio data to the decoder 320 for decompression. The decoder 320 then passes the decompressed data to the scratch buffer 326. The decompressed audio data is transmitted from the scratch buffer 326 to the buffer 335 of the wave driver 330. The digital output of the wave driver 330 is converted to analog by the DAC 338. The DAC 338 then outputs an electrical signal along the line 342 which causes the speaker 340 to produce audio.

Figure 4A:
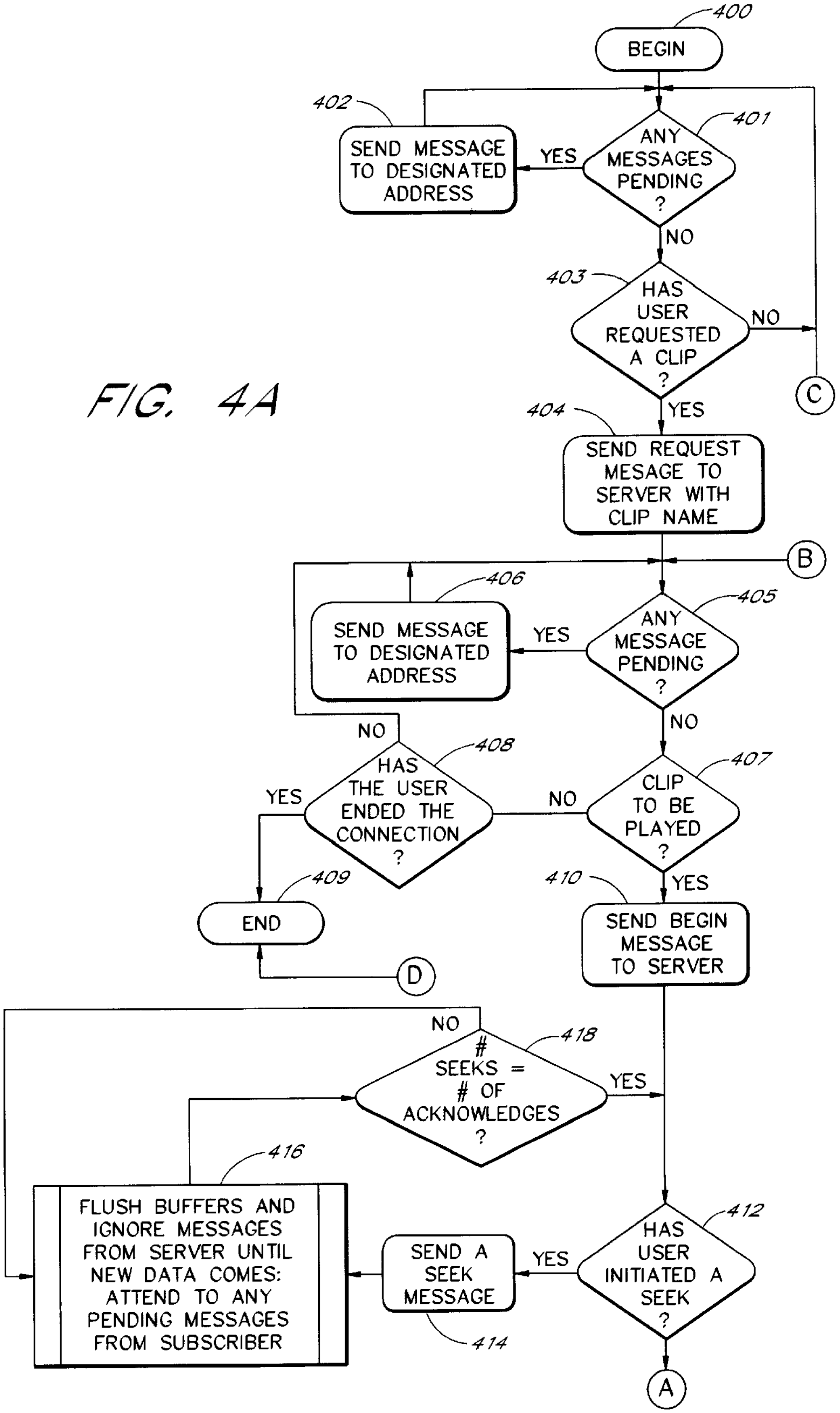
FIGS. 4A and 4B together depict a control flow diagram showing the general method employed by the audio-on-demand system of the present invention to provide real time audio decoding within the CPU of the receiver subscriber audio unit.
Figure 4B:
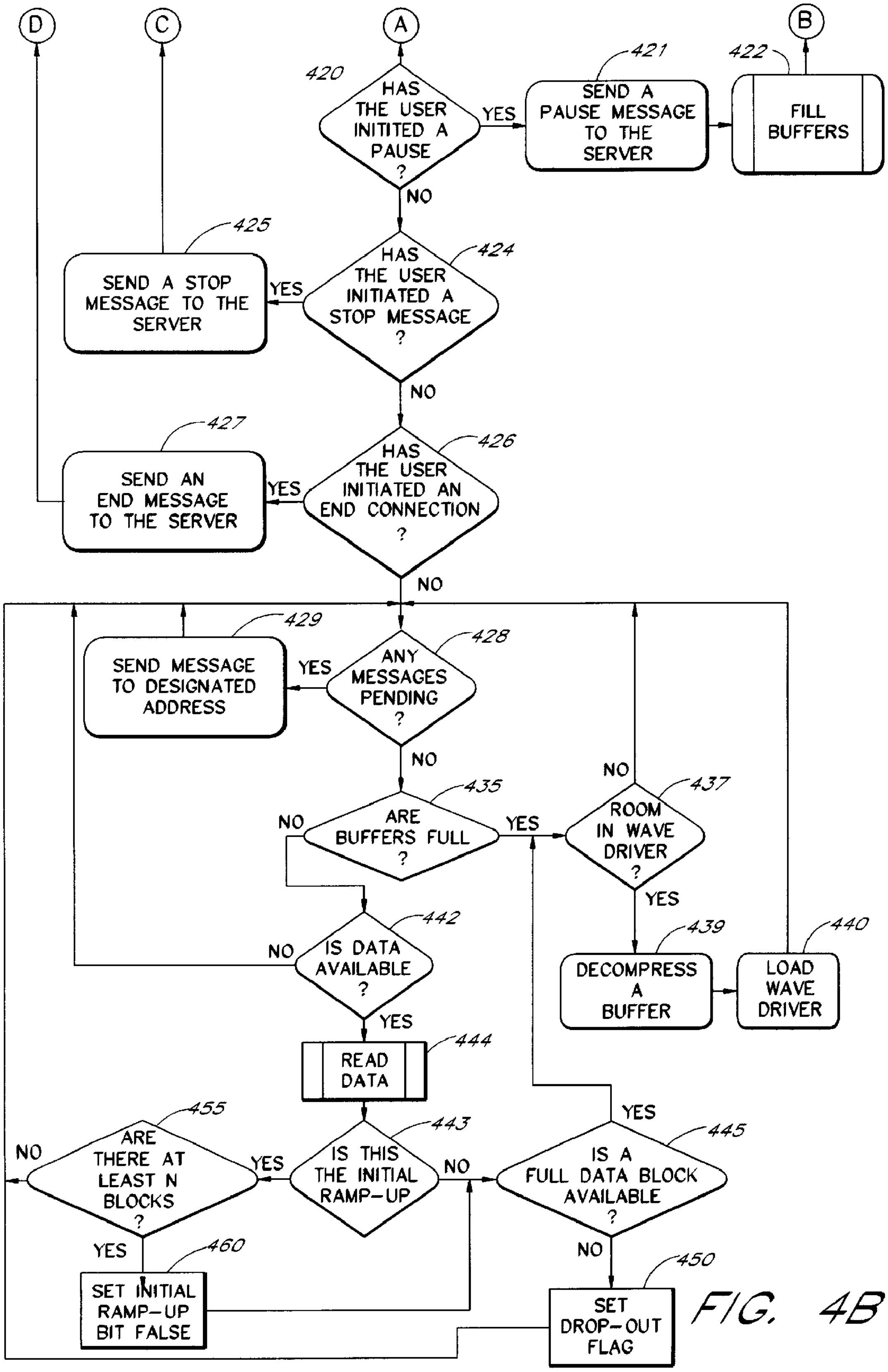

FIGS. 4A and 4B together depict a control flow diagram which describes the flow of control between the CPU 310, the decoder 320, the buffer 315, and the wave driver 330. It should be understood that, in order not to obscure the inventive features of the present invention, the following description of the flow of control within the subscriber PC 110 is not an exhaustive account of all of the signals and control functions associated with the operation of the subscriber PC 110. Thus, a number of conventional operations and signals which relate to the flow of control within the subscriber PC 110 and which are not essential for understanding the teachings of the present invention are not depicted in the flowchart of FIGS. 4A and 4B since these signals and operations are well known to those of ordinary skill in the art. Furthermore, in order to facilitate a clear understanding of the several features of the present invention, FIG. 14 depicts data structures for each of the messages used to communicate between the server 240 and the subscriber PC 110.

Figure 14:
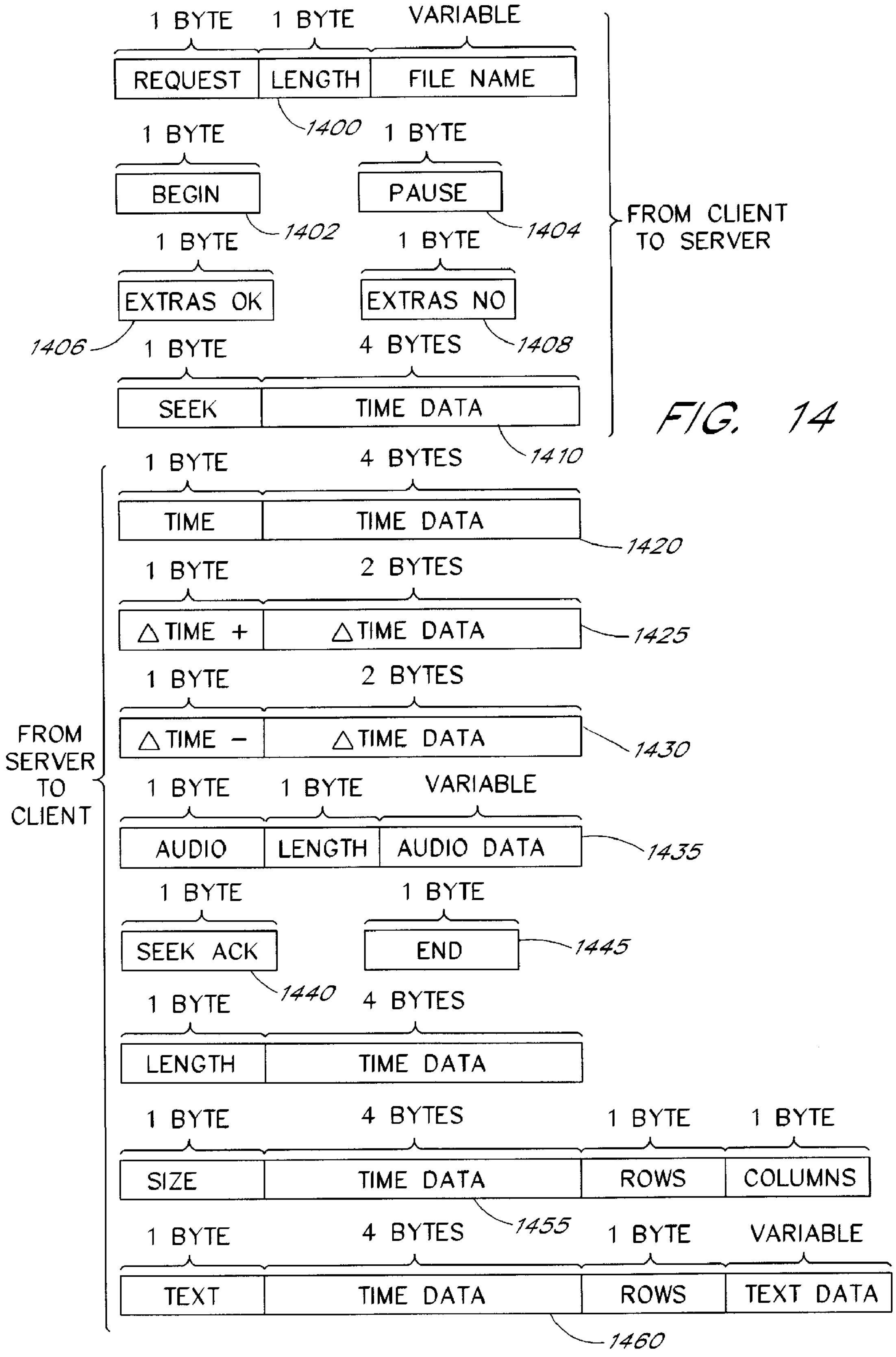
FIG. 14 illustrates the data structures of various data messages transmitted between the server and the subscriber PC in accordance with the teachings of the present invention.

As shown in FIG. 14, messages sent from the subscriber PC 110 to the server include a REQUEST message 1400, a BEGIN message 1402, a PAUSE message 1404, an EXTRAS OK message 1406, an EXTRAS NO message 1408, and a SEEK message 1410. Each of the messages include a one-byte identification field which indicates what type of message is being sent. Some of the messages include a further multiple-byte field containing other information. Specifically, the REQUEST message 1400 includes a one-byte identification field, a one-byte length field, and a multiple-byte name field, having the same number of bytes as indicated in the length field, for storing the name of the requested file. The SEEK message 1410 includes a one-byte identification field and a four-byte time data field. The above described messages will be described in greater detail with reference to the subscriber PC control flow diagram of FIGS. 4A and 4B, as well as FIG. 7, below.

Messages which are transmitted from the server to the subscriber PC 110 include a TIME message 1420, positive and negative ΔTIME messages 1425, 1430, an AUDIO DATA message 1435, a SEEK ACKNOWLEDGE message 1440, an STOP message 1445, a LENGTH message 1450, a SIZE message 1455, and a TEXT message 1460. Each of the messages include a one-byte identification field which indicates what type of message is being sent. Some of the messages include a further multiple-byte field containing other information. Specifically, the TIME message 1420 includes a one-byte identification field and a four-byte time data field. The ΔTIME messages 1425, 1430 each include a one-byte identification field and a two-byte delta, time field. The AUDIO DATA message includes a one-byte identification field, a one byte length field, and a multiple-byte data field, having the same number of bytes as indicated in the length field, and containing audio data. The LENGTH message includes a one-byte identification field and a four-byte time data field. The SIZE message includes a one-byte identification field as well as a four-byte time field, a one-byte rows field, and a one-byte columns field. The TEXT message includes a one-byte identification field as well as a four-byte time data field, a one-byte length field, and a variable length text data field. The above described messages will be described in greater detail with reference to the server control flow diagram of FIGS. 6A and 6B, as well as FIGS. 8-13, below.

As depicted in FIG. 4A, from a begin or startup block 400, control passes to a decision block 401 which determines if any messages are pending within the PC 110. In a typical WINDOWS environment, the CPU 310 must process and respond to a number of pending messages while also supporting the reception, control, and decompression of audio data when an audio clip is playing. The decision block 401 insures that proper processing time is devoted to the currently running applications program. Thus, if the decision block 401 determines that a message is pending, control passes to an activity block 402 wherein the pending messages are sent to their designated addresses. The process then re-enters the decision block 401.

Figure 8A:
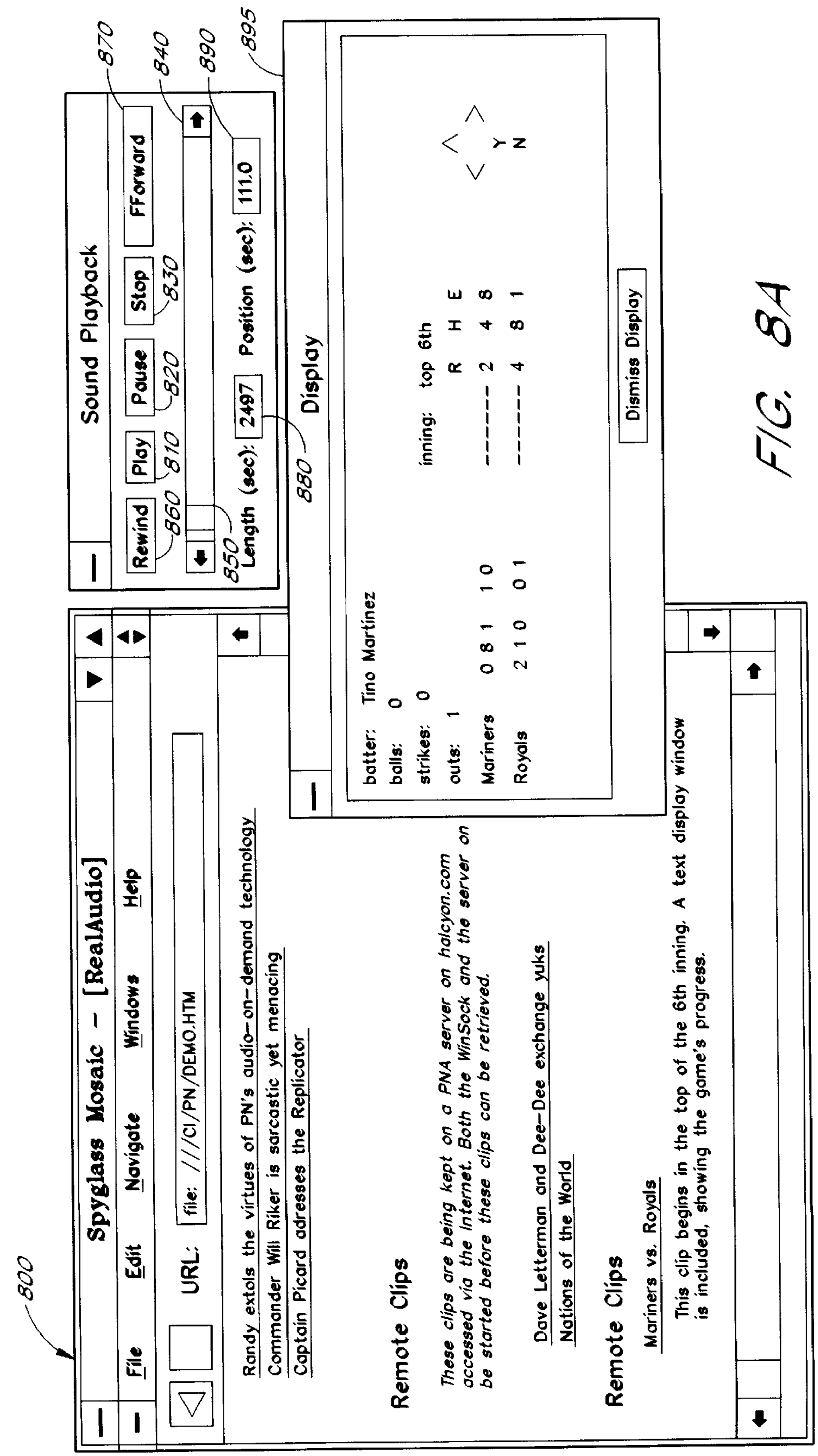
FIG. 8A depicts the various displays observed on the video screen of the subscriber personal computer as the user selects an audio clip to be played from a menu, and selects various options while the audio clip is being played.
Figure 8B:
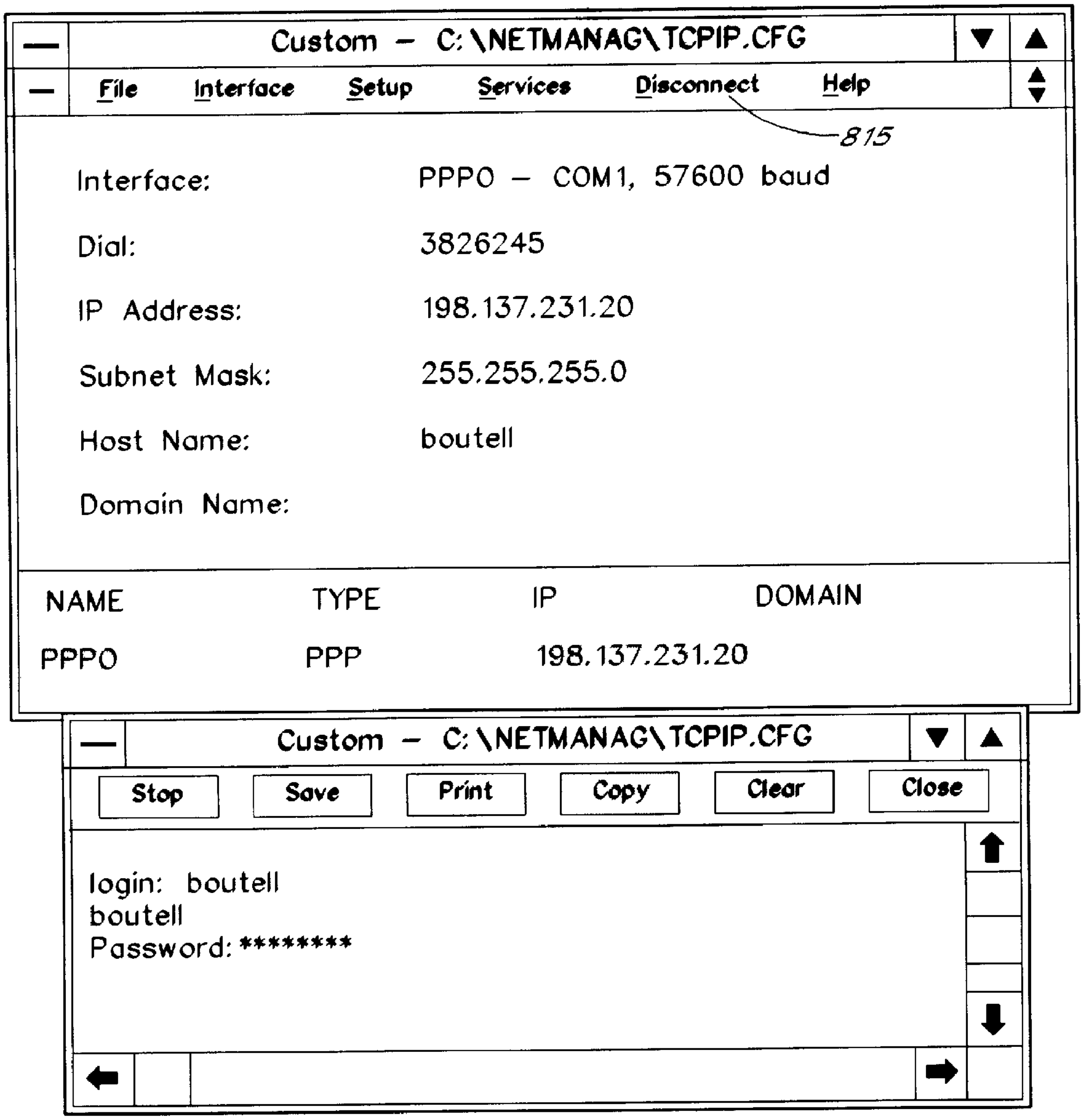
FIG. 8B depicts the various displays observed on the video screen of the subscriber personal computer as the user dials the server, logs into the server system, and initiates a disconnect.

Once it is determined within the decision block 401 that there are no pending messages, control passes from the decision block 401 to a decision block 403, wherein the subscriber PC 110 determines whether or not the user has requested a specific audio clip. In order to request an audio clip, the user typically selects the audio clip from a menu of audio clips displayed on the video display terminal 115 of the subscriber PC 110. FIG. 8A depicts a video display such as a user might observe when selecting an audio clip from a menu 800 of audio clips in accordance with the teachings of the present invention. To select the clip from the menu 800, the user simply directs the mouse pointer over the title of the desired audio clip on the menu and clicks the mouse button once. In other cases, the user may opt to type in the name of an audio clip which the user wishes to be played. Once the user has requested a clip, the subscriber PC 110 transmits a request message to the server 240 which indicates the name of the clip which is to be played. In another embodiment, the request message may also include an address at which the requested audio clip may be located within the server memory bank 230 (see FIG. 2). This operation is represented within the activity block 404. As will be described below with reference to FIG. 6A, the server 240 accesses the requested clip upon reception of the request message from the subscriber PC 110.

Once the subscriber PC 110 has transmitted a request message to the server 240 within the activity block 404, control passes to a decision block 405 wherein the subscriber PC 110 determines if there are any pending messages from the currently running applications program. If the subscriber PC 110 determines that there is a message pending, then control passes to an activity block 406 wherein the message is sent to the designated address. Control then returns to the decision block 405 to determine if more messages are pending. If there are no further pending messages, then control passes from the decision block 405 to a decision block 407.

As indicated within the decision block 407, the subscriber PC 110 determines whether or not the user has indicated that the selected audio clip is to be played. If the subscriber PC 110 determines that the user has indicated that the clip is to be played (e.g., by clicking the appropriate mouse button on a "play" field 810 shown in FIG. 8A), then control passes to an activity block 410, wherein a begin message is sent to the server 240. If the user has not yet indicated that the selected audio clip is to be played, then control instead passes to a delay loop including a decision block 408. The decision block 408 determines whether or not the user has ended the connection while the subscriber PC 110 is waiting for the user to indicate that the selected clip is to be played. If it is determined that the user has ended the connection with the server 240 (e.g., by clicking a mouse button over a "disconnect" field 815 displayed in FIG. 8B), then control passes to an end block 409 and the process is terminated. However, if the user has not ended the connection with the server 240, control passes to the decision block 405 where the subscriber PC 110 again determines if there are any pending messages.

In one embodiment, the user need not initiate playing of the audio clip. Rather, the begin signal is simply transmitted automatically (i.e., control passes directly from the activity block 404 to the activity block 410). As will be described in greater detail below with reference to FIGS. 6A and 6B, upon reception of a begin signal from the subscriber PC 110, the server 240 initiates data transmission of the requested audio clip to the subscriber PC 110.

Once a begin message has been sent to the server 240, control passes from the activity block 410 to a decision block 412. Within the decision block 412, the subscriber PC 110 determines if the user has initiated a seek operation. As illustrated in FIG. 8A, the user may wish at any time within the playing of an audio clip to seek a particular location within the clip and begin playing the clip immediately from that location. It should be made clear here that the time elapsed within an audio clip is typically referred to as the "location" within the audio clip. To seek a particular location within the clip and begin playing the clip immediately from that location, the user need only place the mouse arrow over a box 850 within a play time bar 840 and click and hold. The user then moves the box 850 to another location along the play time bar 840 according to the commonly used "click and drag" method and releases the mouse button to release the box 850 and continue playing the audio clip from the time indicated by the play time bar 840. Alternately, the same operation may be performed by clicking and holding the mouse button down while the mouse pointer is over rewind or fast forward fields 860, 870, respectively. Of course, it will be appreciated that the seek operation may also be accomplished by other methods as well. Thus, if it is determined within the decision block 412 that the user has initiated a seek, control passes to an activity block 414, wherein a seek signal is sent to the server 240. As will be discussed in greater detail below with reference to FIGS. 6A and 6B, when the server 240 receives a seek message from the subscriber PC 110, the server 240 locates the position in the audio clip which is sought by the user and begins retransmitting from that position (Of course, it should be understood that the server 240 never interrupts transmission in the middle of an audio block, but rather interrupts transmission once the full block has been transmitted, in order to avoid protocol errors with the subscriber PC 110). Thus, the SEEK message includes a time stamp (a four-byte time field) which indicates the amount of time, in tenths of a second, by which the audio clip is to be advanced or rewound to the place in the audio clip sought by the user. Of course, it should be understood that seeks performed according to this method are generally used in conjunction with audio clips stored within the memory of the audio control center 120 or local server, and cannot generally be performed with live audio sources, except to rewind to already heard material. Control then passes from the activity block 414 to a subroutine block 416, wherein the subscriber PC 110 flushes the buffers 315 and ignores all messages other than seek acknowledges from the server 240 until the server 240 has acknowledged each seek message not yet acknowledged. Within the subroutine block 416, the subscriber PC 110 also receives N blocks of new audio data within the buffer 315 before resuming playback to reduce the risk of dropout. Furthermore, within the subroutine block 416 the subscriber PC 110 determines if there are any pending messages from the background applications program and attends to any of these messages to insure that the audio-on-demand system of the present invention does not inhibit the performance of the background applications program.

Control passes from the subroutine block 416 to a decision block 418 wherein the subscriber PC 110 determines if the number of seek messages sent by the subscriber PC 110 is equal to the number of seek acknowledge signals received from the server 240. The subscriber PC 110 keeps track of the number of SEEK and seek acknowledge messages to prevent premature playback. Often, when a user indicates that the audio clip is to be played at a different place, the user may inadvertently select playback at several different places in the audio clip before the place which the user wants is actually found by the user. Thus, the subscriber PC 110 does not begin playback until an acknowledge message has been received for every seek message issued by the subscriber PC 110. Once the number of seek acknowledge messages received from the server 240 is equal to the number of seek messages issued by the subscriber PC 110, control returns to the decision block 412. If it is determined within the decision block 412 that the user has not initiated a seek, then control passes immediately from the decision block 412 to a decision block 420 via a continuation point A.

Within the decision block 420, the subscriber PC 110 determines if the user has initiated a pause. This can be done, for example, by clicking the mouse over a "pause" field 820 shown in FIG. 8A. Often times, the user will wish to pause the playing of the selected audio clip in order to attend to some other activity. Thus, the present invention allows the user to pause an audio clip in mid-stream and to resume playing the audio clip at the same point when the user indicates that the audio clip is no longer to be paused. If the subscriber PC 110 determines that the user has initiated a pause, then control passes from the decision block 420 to an activity block 421, wherein a pause signal is sent to the server 240. Control then passes from the activity block 421 to a subroutine block 422, wherein the buffers 315 are filled. When the server 240 receives a pause signal from the subscriber PC 110, the server 240 discontinues transmission of audio blocks until a begin message is received. It should be understood that the server 240 never interrupts transmission in the middle of an audio block. Control returns to the decision block 405 (via a continuation point B) to determine if there are any pending messages, and from the decision block 405 to the decision block 407 to determine if the user has indicated that the audio clip is to resume playing. However, if it was determined within the decision block 420 that the user did not initiate a pause, then control passes immediately from the decision block 420 to the decision block 424.

Within the decision block 424, the subscriber PC 110 determines if the user has initiated a stop message. This may be accomplished by clicking the mouse button over a "stop" field 830 displayed on the video screen 115 as shown in FIG. 8A. If the user has initiated a stop message, then this indicates that the user wishes to discontinue playing the selected audio clip altogether. Consequently, control passes to an activity block 425, wherein a stop signal is sent to the server 240 from the subscriber PC 110. Control then passes from the activity block 425 to the decision block 401 (FIG. 4A) via a continuation point C. If it is determined within the decision block 424, however, that the user has not initiated a stop message, then control passes instead to a decision block 426.

Within the decision block 426, the subscriber PC 110 determines if the user has initiated an end connection message. This means that the user intends to disconnect with the server 240 and request no further audio clips. It should be noted that the end connection message is typically sent by the WINDOWS application program in accordance with conventional methods. In response, control passes from the decision block 426 to an activity block 427, wherein the subscriber PC 110 sends an end signal to the server 240. Control then passes from the activity block 427 to the end block 409 (FIG. 4A) via a continuation point D. If it is determined by the subscriber PC 110, however, that the user has not initiated an end connection message, control passes instead from the decision block 426 to a decision block 428.

Within the decision block 428, the subscriber PC 110 determines if there are any pending messages. If the subscriber PC 110 determines that there are messages pending, then control passes to an activity block 429 wherein the pending message is sent to the designated address. Control then returns to the decision block 428 until there are no further messages pending, at which time control passes from the decision block 428 to a decision block 435.

Within the decision block 435 the subscriber PC 110 determines if the buffers 315 are full. That is, if the buffers have enough room for the next series of data blocks to be transferred from the server 240. If the buffers 315 are full, the subscriber PC 110 determines if there is memory storage space in the wave driver buffers 335, as indicated within a decision block 437. If there is no room in the wave driver buffer 335, this indicates that further data output to the wave driver 330 would not be received within the buffers 335. In response, in order that no data will be lost, control returns to the decision block 428. However, if there is room within the buffers 335 of the wave driver 330, then control passes to an activity block 439.

As indicated in the activity block 439, a block of compressed audio data within the buffer 315 is decompressed by the decoder 320 and is passed to the scratch buffer 326. From the activity block 439, control passes to an activity block 440 wherein the buffer 335 within the wave driver 330 is loaded with the decompressed audio data from the scratch buffer 326. Control then returns to the decision block 428 wherein the subscriber PC 110 checks for pending messages, and from there control passes to the decision block 435 wherein another determination is made if the buffers 315 are full.

If the buffers 315 are not full, then control passes to a decision block 442 wherein the subscriber PC 110 determines if audio data is available from the receiver 300. If audio data is not available from the receiver 300, then control returns to the decision block 428. However, if it is determined within the decision block 442 that audio data is available from the receiver 300, then control passes to a subroutine block 444 wherein the CPU 310 reads the data provided by the receiver 300. The method employed by the present invention to read data within the read data block 444 will be described in greater detail with reference to FIG. 7 below.

Once the data is read within the subroutine block 444, control passes to the decision block 443 wherein a test is performed to determine if this is the initial ramp-up or if a seek has been performed. That is, a determination is made whether or not this is the first audio data received by the buffer 315 since initialization of the audio-on-demand system 100 for a requested clip of audio data, or the first data received after a seek message has been transmitted to the server 240. If the subscriber PC 110 determines that this is not the initial ramp-up or a seek, then control passes to a decision block 445 wherein the CPU 310 determines if a full block of compressed audio data is present within the buffer 315.

If a full block of compressed audio data is not present within the buffer 315, then this indicates that no data can be decompressed from the buffers 315 and passed to the wave driver 330. This is because the audio data transmitted from the server 240 is in packetized form so that data is encoded into blocks and decoded on a block-by-block basis. Control therefore passes to an activity block 450 wherein a dropout flag is set to indicate the possibility of audio dropout. More specifically, the dropout flag may be used as a measure or indication of how well the transfer of audio data is being accomplished. A high frequency of dropout flags indicates that the audio data is not being transferred well while a low frequency of dropout flags indicates that audio data is being transferred smoothly. Control then passes from the activity block 450 to the decision block 428. However, if it is determined within the decision block 445 that a full block of compressed data is present within the buffer 315, then this indicates that data is available to be decompressed and passed to the wave driver 330 via the buffer 326. In response, control passes to the decision block 415 wherein a test is performed to determine if there is room within the wave driver buffers 335, and the previously described method is followed.

If it was determined within the decision block 435 that this is the initial ramp-up or that a seek has been initiated, this indicates that the buffer 315 within the CPU 310 needs to be filled up to a certain level before transmission of audio data can begin. By filling up a certain amount of buffer memory (e.g., 2 Kilobytes of buffer memory), the audio-on-demand system 100 of the present invention guards against dropout of audio data output from the speaker 340. Such dropout could be observed if a series of erroneous data blocks were to be transmitted from the server 240 to the subscriber PC 110 and the buffer 315 was emptied so that no audio data would be passed on to the wave driver 330 or to the speaker 340.

To insure that the buffer 315 has enough data to guard effectively against possible audio dropout, control passes from the decision block 435 to a decision block 455 which determines whether or not N blocks of digitally compressed audio data are present within the buffers 315. In one embodiment, each compressed block of audio data takes up approximately 240 bytes of memory within the buffer 315. The value of N may be chosen to optimize the performance of the system depending upon the specific application. For example, a slower computer may require a higher value of N to guard effectively against audio dropout than the value of N selected for a faster computer. It should also be understood that there are performance tradeoffs for selecting higher and lower values of N. Specifically, if too high a value of N is selected, then there will be a noticeable delay between the time the user selects an audio clip to be played and the time the audio clip is actually output over the speaker 340. If too low a value of N is selected, then there may be noticeable audio dropout, especially at the beginning of the audio clip.

If it is determined within the decision block 455 that N blocks of data are not present within the buffers 315, then control passes from the decision block 455 immediately to the decision block 428. However, if there are N blocks of data present within the buffers 315, control instead passes to an activity block 460 wherein an initial ramp-up bit is set to false. The initial ramp-up bit is monitored in the decision block 443 to determine if the audio-on-demand system is in the initial ramp-up stage. Control passes from the activity block 460 to the decision block 445 to determine if a full block of compressed audio data is available within the buffer 315 to be decompressed.

Figure 5:
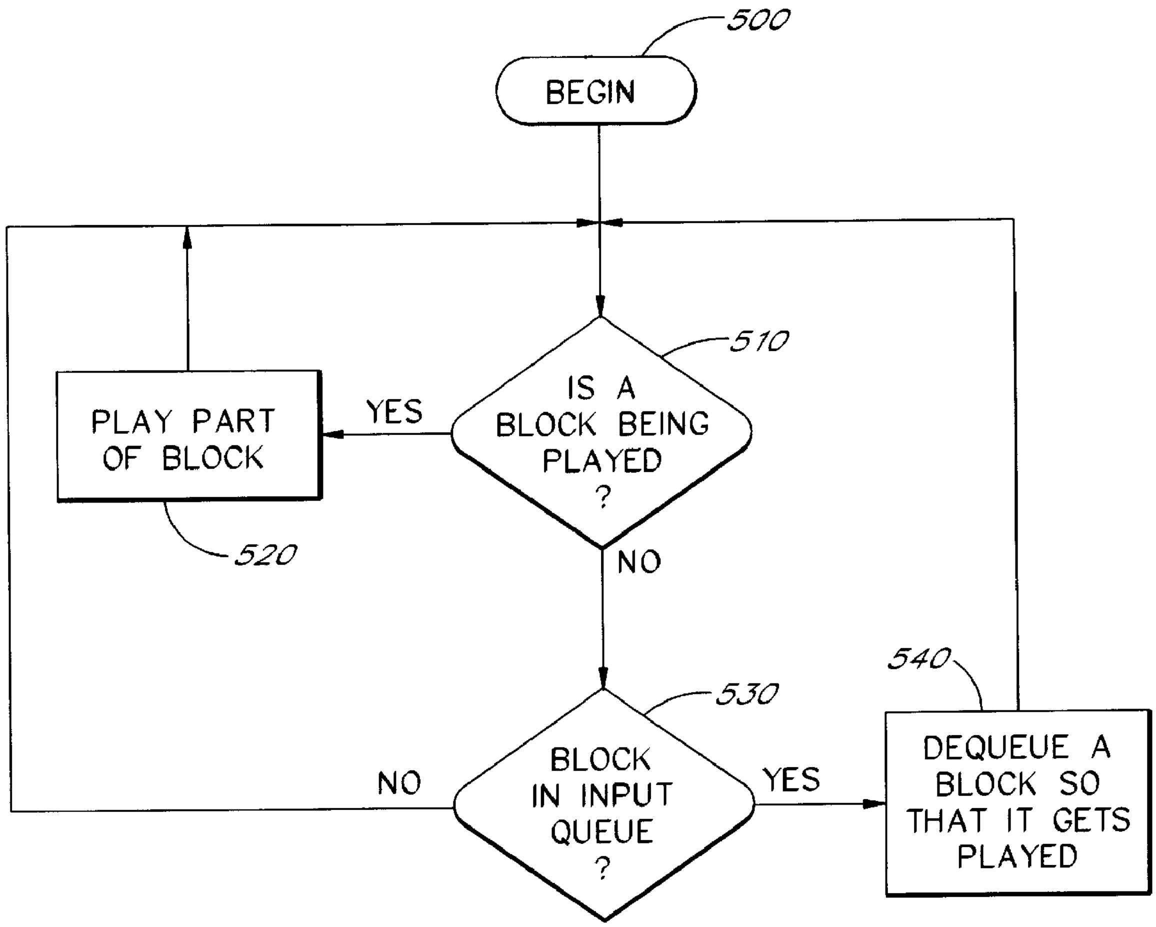
FIG. 5 is a subcontrol flow diagram showing the general operation of the wave driver of FIG. 3.

FIG. 5 details the operation of the wave driver 330. It should be noted that the operation of the wave driver 330 depicted in FIG. 5 is substantially independent of the general control flow operation depicted in the flow chart of FIGS. 4A and 4B, so that the process described in accordance with the flowchart of FIG. 5 can be considered as running as a background process. The control flow for the wave driver 330 initializes in a block 500 and passes to a decision block 510. Within the decision block 510, a determination is made if a block of decompressed audio data is being played by the wave driver 330. If a block of decompressed audio data is being played by the wave driver 330, then control passes to an activity block 520 wherein the remaining parts of the block which is being played are output to the speaker 340. Control then returns to the decision block 510.

If it is determined within the decision block 510 that a block is not being played, then control instead passes to a decision block 530 wherein a determination is made if a block is present within the input buffer 335 of the wave driver 330. If there is no block present within the input buffer 335, then this indicates that no audio data will be played in the next cycle so that some degree of audio degradation or dropout will be observed at the output of the speaker 340. Once control passes from the decision block 530, control returns to the decision block 510. However, if a block is present within the input buffer 335, then control passes to an activity block 540 wherein a block is dequeued so that the dequeued block is played over the speaker 340 under the control of the wave driver 330. Once a block has been dequeued for playback, control passes from the activity block 540 to the decision block 510.

Figure 6A:
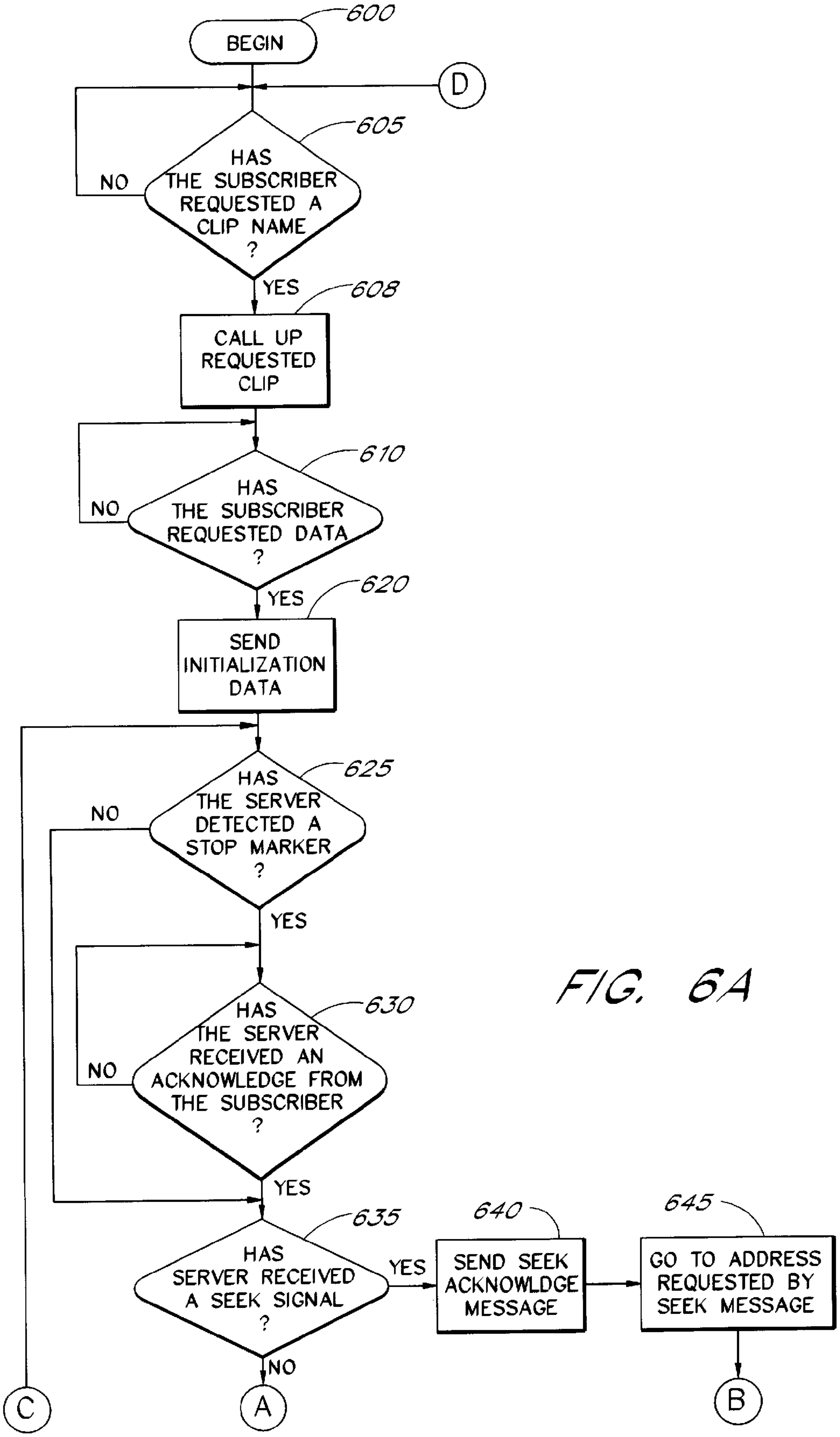
FIGS. 6A and 6B together depict the general flow of control employed within the audio server of the present invention.
Figure 6B:
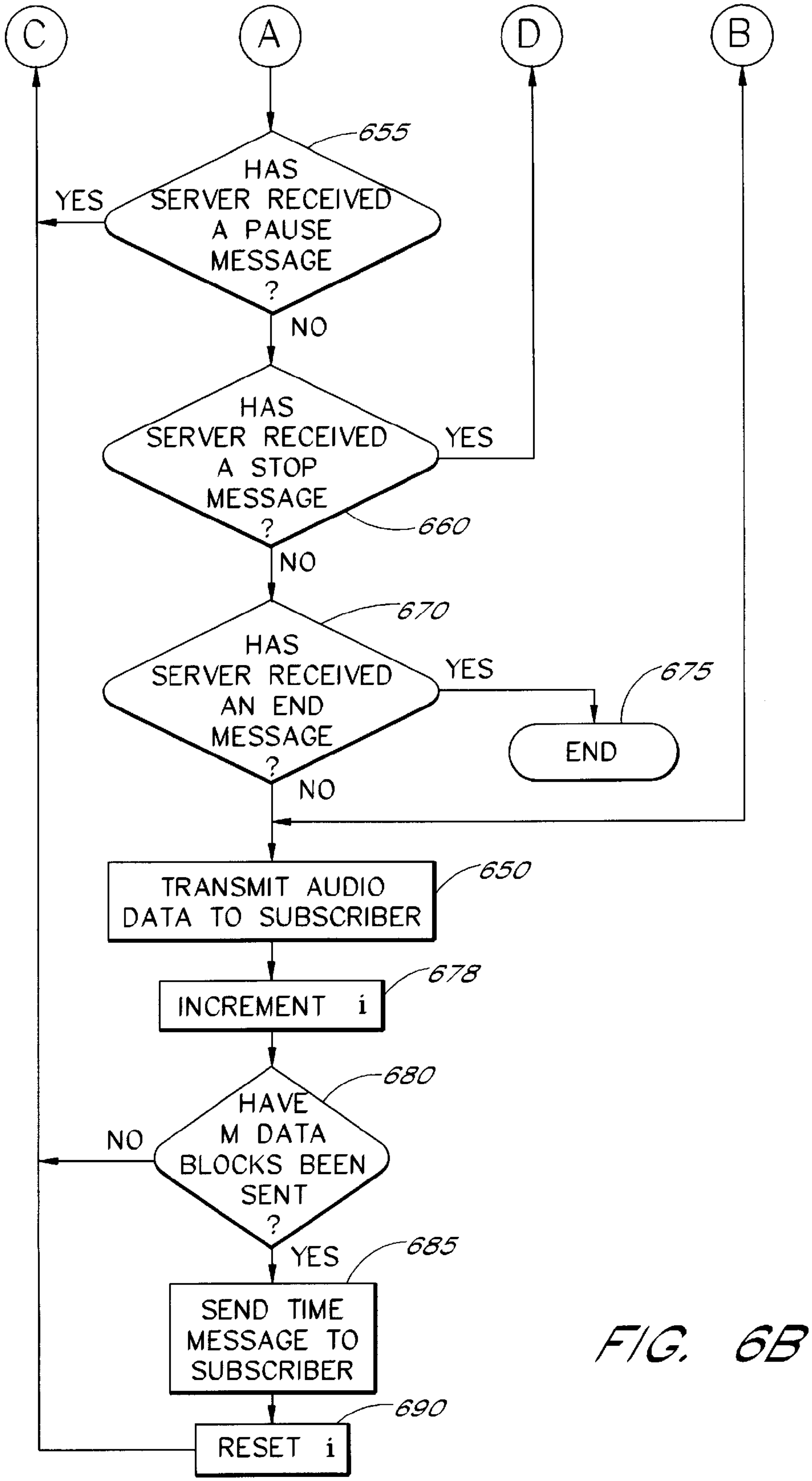

FIGS. 6A and 6B are control flow diagrams showing the general operation of the audio server 240 (or the proxy servers 260) shown in FIGS. 1 and 2. Although the control flow diagram is represented in FIGS. 6A and 6B as operating in conjunction with a single server, one skilled in the art will appreciate that the audio server 240 advantageously operates in conjunction with multiple servers at once. In one preferred embodiment, wherein the server 240 comprises a SUN MICROSYSTEMS workstation, the server 240 is capable of operating in conjunction with as many as sixty servers at once. Control of the audio server 240 passes from a begin block 600 to a decision block 605 wherein the audio server 240 determines if the subscriber PC 110 has requested data. If the subscriber PC 110 has not requested data, the server 240 continues to monitor input lines from the subscriber PC 110 and to perform routine housekeeping activities until a data request is received from the subscriber PC 110. Once the data request is received from the subscriber PC 110, control passes from the decision block 605 to a decision block 610 wherein a test is performed to determine if the subscriber PC 110 has requested the name of the audio clip to be transmitted. If the subscriber PC 110 has not requested the name of the audio clip to be transmitted, then the audio server 240 continues to monitor the input lines from the subscriber PC 110 until a name is requested. The name request sent by the subscriber PC 110 may take the form of a data address of a memory location within the audio control center 120, or simply a string of characters which serves to identify the audio data clip to be transmitted.

Once the subscriber PC 110 has requested the name of the clip, control passes to an activity block 620 wherein initialization data is sent to the subscriber PC 110. The initialization data may advantageously include the name of the clip requested, a table of contents, and a LENGTH of clip message. The table of contents may include information about significant divisions within the data clip to be transmitted and the times at which these divisions occur. The LENGTH of clip message indicates the length of the audio data clip in tenths of a second in one embodiment.

Once the initialization data has been transmitted to the subscriber PC 110, control passes from the activity box 620 to a decision block 625. Within the decision block 625 the audio server 240 determines if the server 240 has detected a stop marker at the end of the last transmitted block of compressed audio data.

Figure 13:
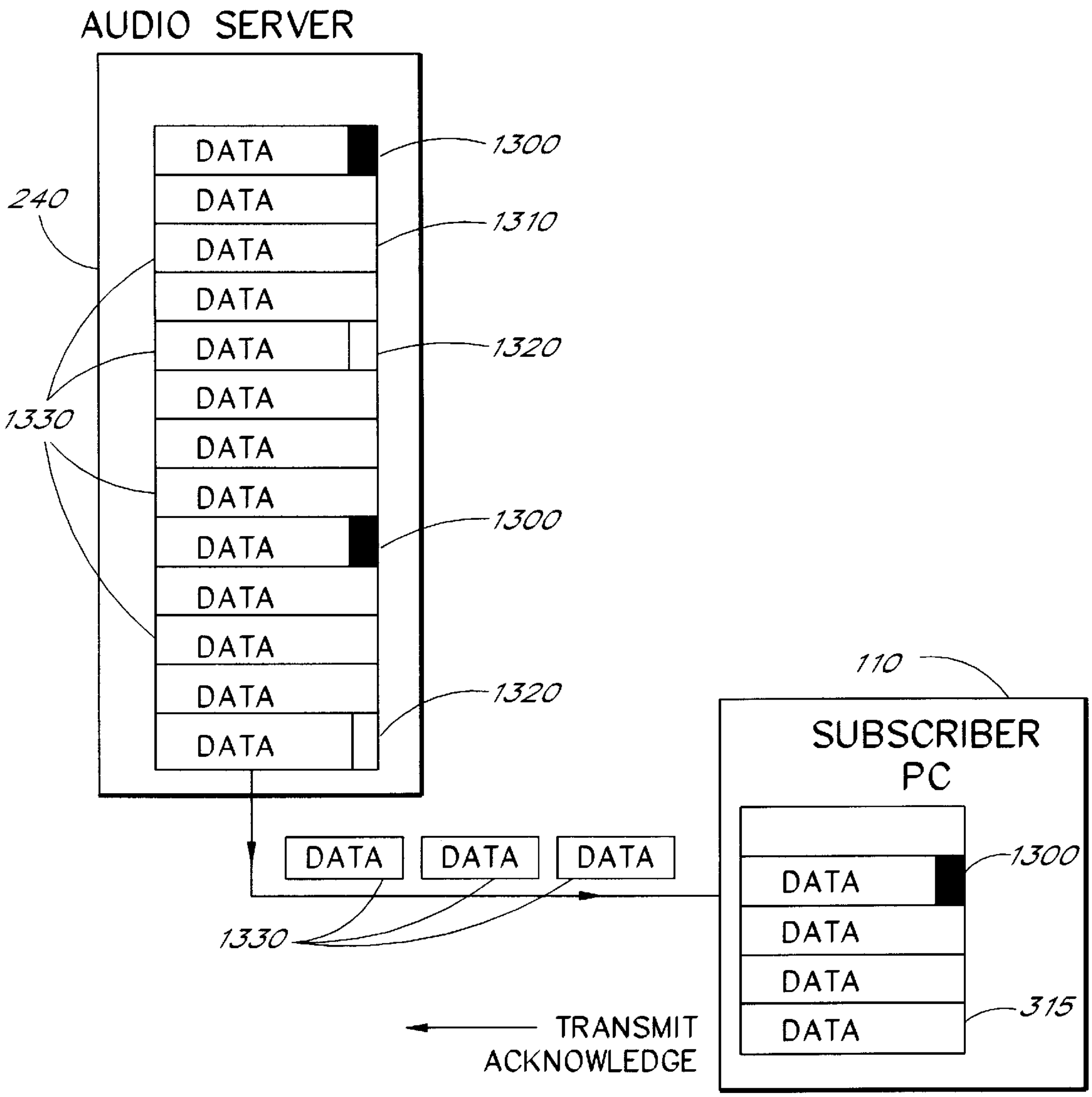
FIG. 13 is a schematic representation of the method used in accordance with the present invention to manage the flow of data blocks from the server to the subscriber PC.

In a preferred embodiment of the present invention, two kinds of markers (i.e., acknowledge and stop markers) are placed at the end of selected blocks of data (e.g., every 1 kilobyte block of data). These markers may be used to help manage the flow of data from the server 240 to the subscriber PC 110. FIG. 13 schematically depicts the method employed in accordance with the present invention to manage the flow of data from the server 240 to the subscriber PC 110. Of course, it will be appreciated that the depiction of the audio server 240 and the subscriber PC 110 in FIG. 13 is highly simplified in order to clearly depict the data flow management aspect of the present invention. An acknowledge marker 1300 advantageously may be placed at the end of every 2 kilobyte block of data within an output memory queue 1310 of the audio server 240, while a stop marker 1320 may be placed at the end of the intermediate 2 kilobyte blocks of data. As discussed above, one advantageous embodiment of the present invention utilizes audio data blocks 1330 of approximately 240 bytes so that eight of these 240 byte data blocks combine to approximately fill a 2 kilobyte data block, as shown in FIG. 13. Of course, it should be noted that the location and frequency of the acknowledge and stop markers 1300, 1320 is preferably selected based upon the processing speed of the subscriber PC 110. Thus, PCs having higher processing speeds and generally are capable of receiving more blocks of data between stop and acknowledge markers.

The acknowledge marker 1300 indicates to the subscriber PC 110 that an acknowledge signal should be sent from the subscriber PC 110 to the server 240. The stop marker 1320 indicates to the server 240 that no further blocks of data are to be transmitted until the server receives an acknowledge signal from the subscriber PC 110. Thus, if the server 240 determines within the decision block 625 that a stop marker 1320 is detected, then control passes to a decision block 630, wherein the server 240 determines if an acknowledge signal has been received from the subscriber PC 110. However, if the server 240 determines that no stop marker 1320 has been detected, then control passes directly to a decision block 635.

By interleaving the acknowledge and stop markers 1300, 1320, the flow of data between the audio server 240 and the subscriber PC 110 can be regulated so that the buffers 315 within the subscriber unit CPU 310 are maintained at near maximum capacity without overflowing. As described above with reference to FIG. 4B, the CPU 310 within the subscriber unit 110 constantly monitors the memory allocated within the buffer 315 within the decision block 435. As data is read into the buffer 315 and acknowledge markers are detected by the receiving CPU 310, the CPU 310 determines how much memory space is left within the buffer 315. If there is sufficient memory space left in the buffer 315 to hold as much data as will be transmitted from the server 240 until the stop marker after the next acknowledge marker is detected by the server 240 (e.g., 1440 bytes of data), then the subscriber PC 110 transmits an acknowledge signal to the server 240. However, if there is not sufficient memory space within the buffer 315 to hold the data that would be transmitted, then the subscriber PC 110 does not transmit an acknowledge signal to the server 240. When the subscriber PC 110 determines that there is sufficient room within the buffer 315, then the subscriber PC 110 transmits the acknowledge signal to indicate to the server 240 that more data can be transmitted to the subscriber PC 110. In this manner, the acknowledge and stop markers regulate the flow of data from the server 240 to the subscriber PC 110 to insure that the buffers 315 within the subscriber unit CPU 310 are maintained at near maximum capacity without overflowing. The above described method of regulating the flow of data between the subscriber PC and the server 240 may be implemented external to the server 240 and the subscriber PC 110 in flow controllers 272, 280 as shown in FIG. 2B, or may simply be implemented within the server 240 and the subscriber PC 110, as described above. It should be noted here, however, that in applications where the server 240 communicates with the subscriber unit 110 via a specialized communication link, such as TCP/IP, which provides data flow management services automatically, it is not necessary to employ the above-described method of regulating data flow from the server 240 to the subscriber PC 110.

If the server 240 determines within the decision block 630 that an acknowledge signal from the subscriber PC 110 has not been received, this indicates that the subscriber PC 110 has not yet successfully received and buffered the previously transmitted data block. In response, control returns to the decision block 630 wherein another test is performed to determine if an acknowledge signal has been received. Consequently, when the audio server 240 detects a stop marker, the server 240 will wait for an acknowledge signal from the subscriber PC 110 so that additional data blocks are not transmitted to the subscriber PC 110 until an acknowledge signal has been received from the subscriber PC 110. Once the server 240 has received the acknowledge signal from the subscriber PC 110 indicating that the transmitted data block has been successfully buffered at the subscriber PC 110, then control of the method passes to the decision block 635.

Within the decision block 635 the audio server 240 determines if the server 240 has received a seek signal from the subscriber PC 110. As detailed above, the seek signal is transmitted by the subscriber PC 110 when the subscriber PC 110 intends to scan through the audio clip being transmitted by the server 240 and locate an audio portion on the clip. For instance, if the user is listening to the recording of a song and the user wishes to replay the last 10 seconds over again, the user inputs this information into the PC 110. The subscriber PC 110 then sends a seek message to the audio server 240. The seek message includes a binary value, which represents, in tenths of seconds, the location in the audio clip being played to which the user wishes to advance or retreat. When the server 240 receives a seek signal from the subscriber PC 110, control passes from the decision block 635 to an activity block 640 wherein a seek acknowledge message is sent from the server 240 to the subscriber PC 110. The seek acknowledge message indicates to the subscriber PC 110 that the seek message has been received by the server 240, so that the subscriber PC 110 can prepare to receive new data.

Control passes from the activity block 640 to an activity block 645 wherein the audio control center 120 scans within the memory location containing the audio clip being transmitted and goes to an address at or near the time requested by the seek message. Control then passes from the activity block 645 to an activity block 650 via the continuation point B so that the audio data block at the location requested by the subscriber PC 110 is now transmitted to the subscriber PC 110 from the server 240, as indicated within the activity block 650.

If the server 240 has not received a seek signal from the subscriber PC 110 then control passes from the decision block 635 to a decision block 655. Within the decision block 655, a test is performed to determine if the server 240 has received a pause message. If the server 240 has received a pause message from the subscriber PC 110, this indicates that the user of the subscriber PC 110 wants to temporarily discontinue listening to the audio clip. Thus, in this case, the server 240 transmits enough data to fill up the buffers 315 of the subscriber unit CPU 310, and then discontinues data transmission until a resume signal, which, in one embodiment, is identical to the begin signal transmitted within the activity block 411, is received from the subscriber PC 110. In response, control passes from the decision block 655 to the decision block 625. If, however, the server 240 has not received a pause message, control passes instead to a decision block 660 wherein a test is performed to determine if the server 240 has received a stop message. A stop message indicates that the user wishes to discontinue the particular audio clip being played. If the server 240 has received a stop message, then control passes from the decision block 660 to the decision block 605. However, if the server 240 has not received a stop message, then control passes to decision block 670 via a continuation point A.

Within the decision block 670 (see FIG. 6B) the audio server 240 determines if the server 240 has received an end message from the subscriber PC 110. An end message indicates that the subscriber PC 110 no longer wishes to access audio data from the audio control center 120. In response, control passes from the decision block 670 to an end block 675 when the server 240 receives an end message from the subscriber PC 110.

If a server 240 has not received an end message from the subscriber PC 110, control passes from the decision block 670 to the activity block 650 wherein the next one kilobyte block of compressed audio data is transmitted to the subscriber PC 110. From the activity block 650, control passes to an activity block 678 wherein an indexing variable, i, is incremented. Control then passes to a decision block 680 wherein the audio server 240 performs a test to determine if M data blocks have been sent. Every M data blocks the server 240 sends a time message which consists of information relating to the time elapsed within the audio clip. The time message may consist of an independent message signal which typically precedes an audio data block. Thus, if M data blocks have been sent by the server 240 to the subscriber PC 110 successively, (i.e., the indexing variable i equals M) then control passes to an activity block 685 wherein the time message is sent to the subscriber PC 110. As indicated above, the time message indicates the time elapsed within the audio clip being sent. Control passes from the activity block 685 to an activity block 690 wherein the variable i is reset to 0. Control then returns to the decision block 625 (see FIG. 6A) via the continuation point C. Of course, it should be understood that, in one embodiment, a time stamp is included with every data block so that it is not necessary to include the operations represented in the blocks 678-690.

Figure 7:
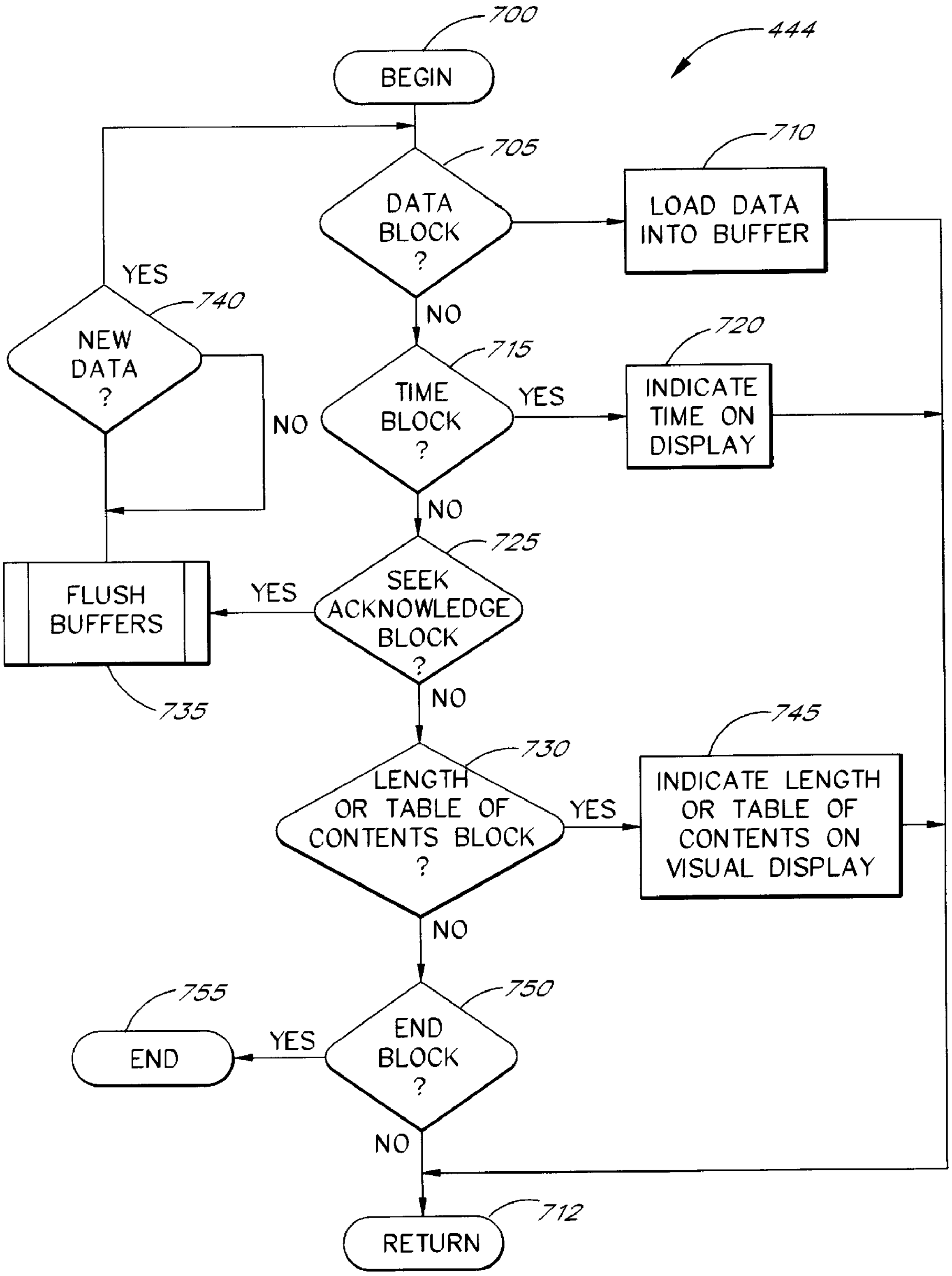
FIG. 7 depicts a control flow diagram which details the method employed within the read data subroutine block of FIG. 4B.

FIG. 7 depicts a control flow diagram which details the method employed within the read data subroutine block 444 of FIG. 4B. Once it has been determined that a data block should be read, the subscriber PC 110 determines what kind of data block is provided at the output of the receiver 300 (FIG. 3). Control passes from a begin block 700 to a decision block 705, wherein the subscriber PC 110 determines if the data block provided at the output of the receiver 300 contains audio data. As detailed above, an AUDIO DATA block typically includes a one-byte identifier field which indicates that the block is an AUDIO DATA block, a one-byte length field which indicates the length, in bytes, of the data field to follow, and a multiple-byte data field which contains digitized audio data. If the subscriber PC 110 determines that audio data is provided at the output of the receiver 300, then control passes to an activity block 710, wherein the AUDIO DATA block is loaded into the buffer 315. Control then passes to a return block 712 which passes the operation of the system back to the flow of control depicted within FIG. 4B (i.e., control returns to the decision block 443 in FIG. 4B). However, if the subscriber PC 110 determines that the data block provided at the output of the receiver 300 does not contain audio data, then control passes from the decision block 705 to a decision block 715.

Within the decision block 715, the subscriber PC 110 determines if the data available indicates the time elapsed within the audio clip being played. That is, if the data available at the output of the receiver 300 is a TIME data block. In one embodiment, the TIME data block comprises four bytes of data indicating the time elapsed, in tenths of a second, within the currently played audio clip. When a TIME data block is detected within the decision block 715, control passes to an activity block 720, wherein the time data contained within the TIME data block is indicated on the video display 115 of the subscriber PC 110 within a time elapsed field 890 (FIG. 8A). Alternatively, in order to save bandwidth, the server 240 could simply transmit a three-byte ΔTIME message which indicates the time difference between the last time update and the current time. For example, assuming the time differences between updates is small, if the audio clip is at 1:01.6 (one minute, one and six tenths seconds) when the last time update arrives, and 0.3 seconds elapse between the last update and the current update, then a ΔTIME signal having a binary value corresponding to 0.3 seconds is sent to the subscriber PC 110 from the server. This requires fewer bits to transmit than a message indicating a binary value of 1:01.9, so that bandwidth may be saved by using ΔTIME messages rather than TIME messages. Control then passes from the activity block 720 to the return block 712. However, if the subscriber PC 110 determines within the decision block 715 that the data block available at the output of the receiver 300 is not a TIME data block, control passes to a decision block 725.

Within the decision block 725, the subscriber PC 110 determines if the data block available at the output of the receiver 300 is a SEEK ACKNOWLEDGE block. As described above, the SEEK ACKNOWLEDGE block is a one-byte acknowledge from the server 240 that the server 240 has received a seek message from the subscriber PC 110. If the data block available at the output of the receiver 300 is a SEEK ACKNOWLEDGE block, control passes from the decision block 725 to a subroutine block 735, wherein the buffers 315 are flushed. That is, the buffers 315 are emptied. In one embodiment, the buffers 315 are flushed by simply outputting the data contained within the buffers to the wave driver 330 and playing the remaining audio data over the speakers 340. In another embodiment, the buffers 315 are emptied without playing the audio data contained within the buffers. Control passes from the subroutine block 735 to a decision block 740, wherein the subscriber PC 110 waits for new data to arrive from the server 240. If new data has not arrived, then control returns to the decision block 740 until new data arrives. Once new data arrives from the server 240, control passes from the decision block 740 back to the decision block 705. If it was determined within the decision block 725 that the data block available at the output of the receiver 300 is not a SEEK ACKNOWLEDGE data block, control passes from the decision block 725 to a decision block 730.

Within the decision block 730, the subscriber PC 110 determines if the data available at the output of the receiver 300 is a data block indicating the length of the audio clip to be transmitted (i.e., a LENGTH block), or a data block containing a table of contents (i.e., a TOC block) relating to the order of audio data within the audio clip to be sent. In one embodiment, data blocks containing information relating to the length of the audio clip to be played comprise a four-byte data block indicating length in tenths of a second, while the data blocks containing information relating to a table of contents of the audio clip to be played comprise an multiple-byte data block which varies according to the size of the table of contents to be transmitted. If the subscriber PC 110 determines that the data block available at the output of the receiver 300 is, in fact, a LENGTH data block, or a TOC data block, control passes from the decision block 730 to an activity block 745 within the activity block 745, the subscriber PC 110 indicates the length of the audio clip to be played on the video display 115 of the subscriber PC 110 within a length field 880 (FIG. 8A), or displays the table of contents information on the video display 115 of the subscriber PC 110 within a table of contents display box 895 (FIG. 8A). Control then passes from the activity block 745 to the return block 712. However, if it is determined within the decision block 730 that the data block available at the output of the receiver 300 is not a LENGTH block or a TOC data block, control passes instead to a decision block 750.

As indicated by the decision block 750, the subscriber PC 110 determines if the data block is an END data block. If the data block available at the output of the receiver 300 is an END data block, control passes from the decision block 750 to an end block 755, wherein the subscriber PC 110 terminates the connection with the audio control center 120. However, if no END data block is detected at the output of the receiver 300, control passes to the return block 712, and control returns to the method depicted in FIG. 4B.

In addition to providing real time audio on demand using only the processing power available within a conventional personal computer system, such as an IBM PC having a 486 microprocessor, in accordance with the apparatus and method described above, the present invention also provides a number of other significant and advantageous features. In one embodiment the present invention allows for transmission of higher quality data by intermixing audio data blocks having lossless compression (i.e., compression which results in substantially no loss of digital data) or compression which produces data which is sent in greater than real time, with audio data blocks compressed according to the IS-54 standard specified compression algorithm. Furthermore, the present invention advantageously contemplates providing an authoring tool which gives the user the ability to unify video and audio data. Additionally, the system of the present invention advantageously provides a visually displayed outline of the audio data wherein visual data which relates to the audio data being played is displayed on the video display terminal 115 of the subscriber PC 110. Furthermore, the user advantageously may have instant access to any one of a number of significant divisions within the audio clip being played. For example, a user listening to a baseball game via the audio-on-demand system of the present invention may decide to advance to the bottom of the 9th inning from some other place within the baseball game audio clip. Finally, in a further aspect of the present invention, the audio-on-demand system of the present invention may advantageously dynamically allocate server/subscriber pairs based upon geographic proximity and quality of communication links so as to maximize the quality of the audio data transmitted from the server to the subscriber.

Figure 9:
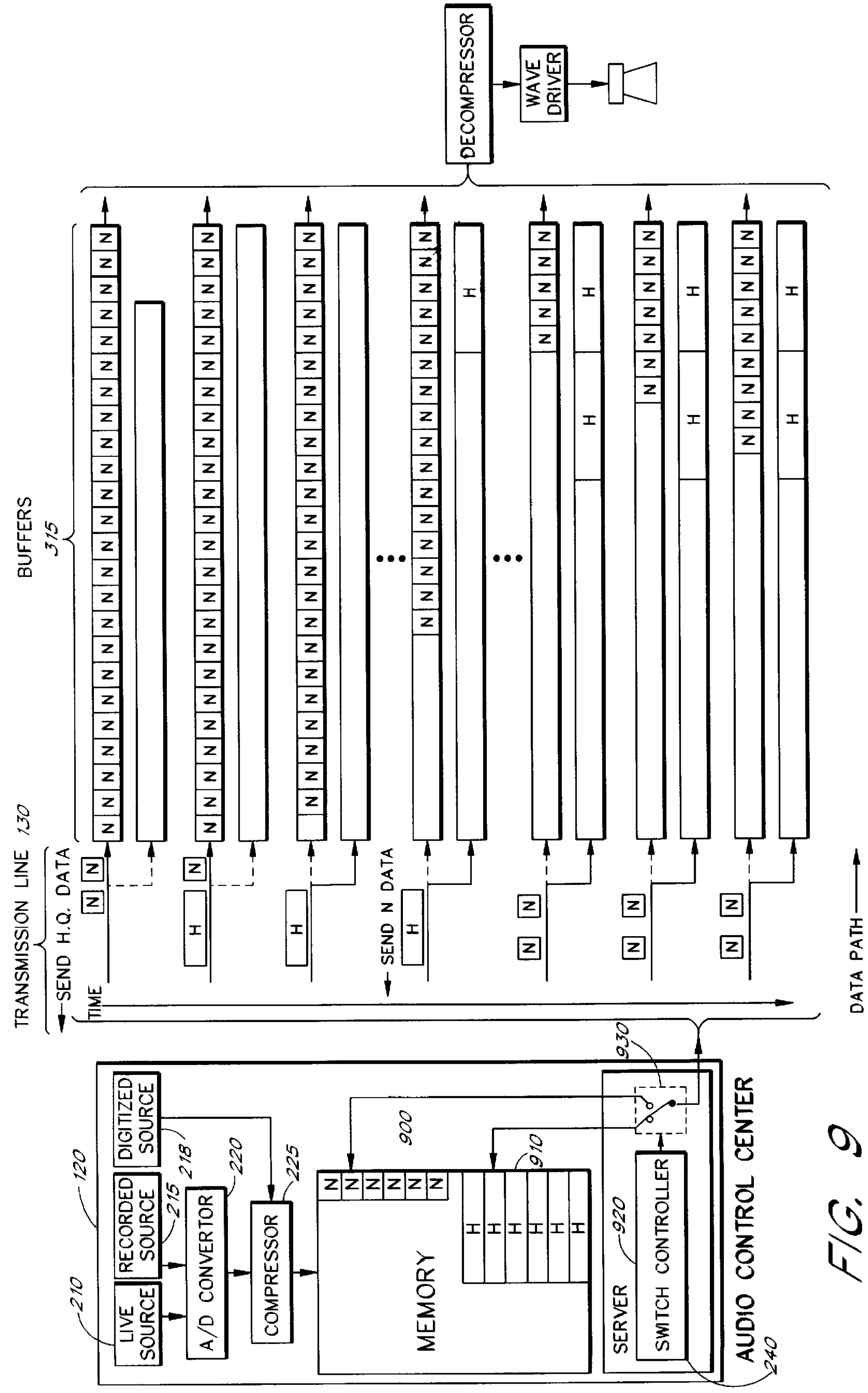
FIG. 9 is a schematic representation of an exemplary data transaction between a server and a subscriber unit which illustrates method used in the high quality transmission mode of the present invention.

FIG. 9 illustrates one feature of the present invention wherein high quality audio data which is compressed according to a lossless compression algorithm is mixed with normal quality audio data which is compressed according to the compression algorithm specified within the IS-54 standard. Since the audio-on-demand system 100 allows for greater than real time delivery of audio data to the subscriber PC 110 in many cases, the buffers 315 may be loaded to a capacity such that it is safe to transmit short bursts of high quality audio at lower than real time. These bursts of data are advantageously transmitted in advance of the actual time in which they will be played to provide for high quality audio segments of significant length.

In one preferred embodiment, the present invention provides for high quality playback of audio data by including a separate “high quality” buffer 1110 (FIG. 11) within the DRAM of the subscriber PC 110 for holding high quality audio data. In such an embodiment, the user may indicate which portions of the audio clip are to be designated as “high quality.” The high quality audio data corresponding to the designated portions of the audio clip to be played is then sent in advance (e.g., during initial ramp-up, or when the buffer 315 is full) to the subscriber PC 110 where this data is stored in the separate “high quality” buffer 1110. This data would be accompanied by a time stamp indicating when it should be played. The high quality data is then decompressed at the time indicated by the time stamp to provide high quality playback of selected portions of the selected audio clip.

In another preferred embodiment, the audio clip includes predesignated portions of high quality audio data. This data is predesignated based upon the kind of data to be transmitted. Advantageously, musical jingles in a spoken narration (such as a commercial) or other musical data or sound effects (e.g., recorded animal sounds and excerpts from actual speeches) in the context of a spoken narration could be predesignated as high quality. This is particularly advantageous since high compression audio algorithms, such as that employed in accordance with the present invention to create normal quality compressed audio data, typically do not provide high quality reproduction for musical audio data. In such an embodiment, the predesignated high quality data is transmitted in advance so that a substantial portion (e.g., a twenty or thirty second clip) of audio data is stored in the high quality buffer 1110. The high quality data is then played back at the times designated by the time stamp associated with each data block.

According to these embodiments of the invention, the subscriber PC 110 continuously monitors the status of the buffers 315 to determine if the buffers 315 typically remain at or near maximum capacity. If the subscriber PC 110 determines that the buffers 315 are at or near maximum capacity a high percentage of the time (e.g., advantageously 85%, while percentages in the range of 60% to 95% may be used as well, as called for by the specific application), then the subscriber PC 110 will send a high quality message (e.g., the EXTRAS OK message) to the audio control center 120. The high quality message indicates to the audio control center 120 that the audio control center 120 should transmit high quality data compressed according to a lossless compression algorithm. The high quality data will be based upon the same audio source information as the normal quality data. Thus, no discontinuities will be perceived by the listener in the audio data transmitter. Therefore if, for example, it is determined that there is insufficient bandwidth to send high quality data, normal quality data may be transmitted instead as a substitute for the high quality data. As the high quality audio data is received by the subscriber PC 110, the subscriber PC 110 monitors the status of the buffers 315. If the buffers 315 fall below a certain percentage of maximum capacity (e.g., 60% of maximum capacity), then the subscriber PC 110 sends a message to the audio control center 120 to discontinue transmission of the high quality data and instead supply the audio data compressed according to the IS-54 standard. In this manner, high quality data is transmitted in advance so that significantly long portions of high quality data may be assembled within the high quality buffer within the subscriber PC 110.

It should be understood that the audio control center 120 shown in FIG. 9 is simplified, for purposes of the following description, to show only a single memory bank rather than the disk and archival storage locations 230, 235 depicted in FIG. 2A. According to this embodiment of the invention, an audio data bank 900 contains audio data compressed according to the compression algorithm specified by the IS-54 standard, while another audio data memory bank 910 contains data compressed according to a lossless compression algorithm or a compression algorithm which requires transmission of audio data in greater than real time. In one embodiment, the lossless compression algorithm used in accordance with the present invention is the well known LEMPEL-ZIV audio compression algorithm. Such an audio compression algorithm has a compression ratio of approximately 3:1. A switching system (which is advantageously implemented in software) including a switch controller 920 and a high speed switch 930 is provided which allows the audio control center 120 to switch alternately between the audio bank 900 and the audio bank 910.

A time elapsed sequence of data transfers is schematically depicted in FIG. 9 wherein the data transfer sequence begins at the top and continues in order to the bottom. In the schematic representation of FIG. 9, each box of the buffers 315 represents a memory storage location capable of holding, for example, one compressed block of normal quality audio data. Those boxes containing a "N" contain normal quality compressed audio data (i.e., data compressed according to the compression algorithm specified in the IS-45 standard), while data blocks containing an "H" contain high quality compressed audio data (i.e., data compressed according to a lossless compression algorithm). As shown in FIG. 9, each high quality audio block corresponds to approximately the same audio playback time as one normal quality audio block but requires significantly more memory storage space. Each high quality audio storage block is shown as taking up approximately eight times the memory storage taken up by each normal quality audio block.

When the subscriber PC 110 determines that the buffers 315 are near maximum capacity (e.g., above 85% of capacity), this indicates that the normal quality data is being transferred in real time or greater than real time. In response, the subscriber PC 100 sends a "high quality" signal to the audio control center 120 to indicate that high quality data should be sent by the audio control center 120.

When the audio control center 120 receives the "high quality" signal from the subscriber PC 110, the switch controller 920 within the audio control center 120 causes the switch 930 to connect the high quality data bank 910 to the output line 130. In response, the audio control center 120 causes high quality data to be sent over the telephone line 130 to the subscriber PC 110. In one embodiment, in order to assure that no audio data is lost during switching, an address pointer is constantly scanning addresses corresponding to identical audio data in both audio banks 900, 910. Thus, the audio data output by the high quality audio data bank 910 will contain the same audio information as would have been provided by the normal quality audio data bank 900.

As shown in FIG. 9, the high quality audio data takes more time to transmit since more data is being transmitted at the same baud rate. Thus, the high quality data is represented as being in wider blocks which are spaced farther apart on the communication line 130 than are the normal quality data blocks. Of course, it will be understood that, although several blocks of data are represented as being placed simultaneously on the line 130, in practice, one or two blocks will typically be present on the line at a time while the other blocks represented are understood to be pending in a server output queue (not shown).

Once a "high quality" request is issued by the subscriber PC 110 the normal quality data still on the line 130 is received by the buffers 315, so that the buffers 315 remain at maximum capacity due to the high transmission rate of the normal quality data. This case is depicted in the first (i.e., top) two stages of the time elapsed data transfer sequence of FIG. 9. However, once the remaining normal quality data blocks have been received into the buffers 315, high quality data blocks are subsequently received by the high quality buffer 1110. The middle three stages of the time elapsed data transfer sequence of FIG. 9 depict high quality data blocks being read into the buffer 1110. As with the normal quality data, the high quality data blocks are read into the buffer 1110 in small bits (e.g., in 240 byte blocks) at a time. Thus, the high quality data is continuously being read into the buffer 1110 as the normal quality data blocks are evacuating. The high quality data blocks remain in the buffer 1110 until the designated time in the audio clip at which the high quality data blocks are to be played.

Once the buffers 315 fall beneath a certain percentage of maximum capacity (e.g., 60%), the subscriber PC 110 transmits a "normal quality" signal to the audio control center 120 to indicate that the audio control center 120 should discontinue transmitting data from the high quality audio bank 910 and resume transmitting data from the normal quality audio bank 900. This is depicted in the fourth stage of the time elapsed data transfer sequence of FIG. 9. In response to the "normal quality" signal, the switch controller 920 connects the normal quality audio data bank with the communication line 130 via the high speed switch 930. All the while, an address pointer is constantly scanning addresses corresponding to identical audio data in both audio banks 900, 910. Thus, the audio data output by the normal quality audio data bank 900 will contain the same audio information as would have been provided by the high quality audio data bank 910. As the normal quality data blocks are transmitted at greater than real time, the buffer 315 begins to refill and approach maximum capacity. This is depicted in the last three stages of the time elapsed data transfer sequence of FIG. 9. Once the buffer 315 has remained at or near maximum capacity for a predetermined amount of time (or the frequency of dropout flags is sufficiently low), the process is repeated so that high quality data can be periodically combined with normal quality data. Thus, an audio signal having small periods of higher quality playback is provided using the above-described feature of the present invention so that a net overall improvement of sound quality results.

Under another aspect of the present invention, limited "metadata" is also transmitted in synchronism with the audio data. In the context of the present invention, metadata should be understood to mean extra or additional data beyond the already transmitted normal quality audio data (e.g., text, captions, still images, limited video, high quality audio data, etc.). Thus, for example, a graphic display may be provided on the video display 115 of the subscriber PC 110 which depicts still images of people whose voices are played in the audio clip. A caption or other indicia may be used to indicate which of the visually depicted speakers is currently speaking in the audio clip.

Figure 10:
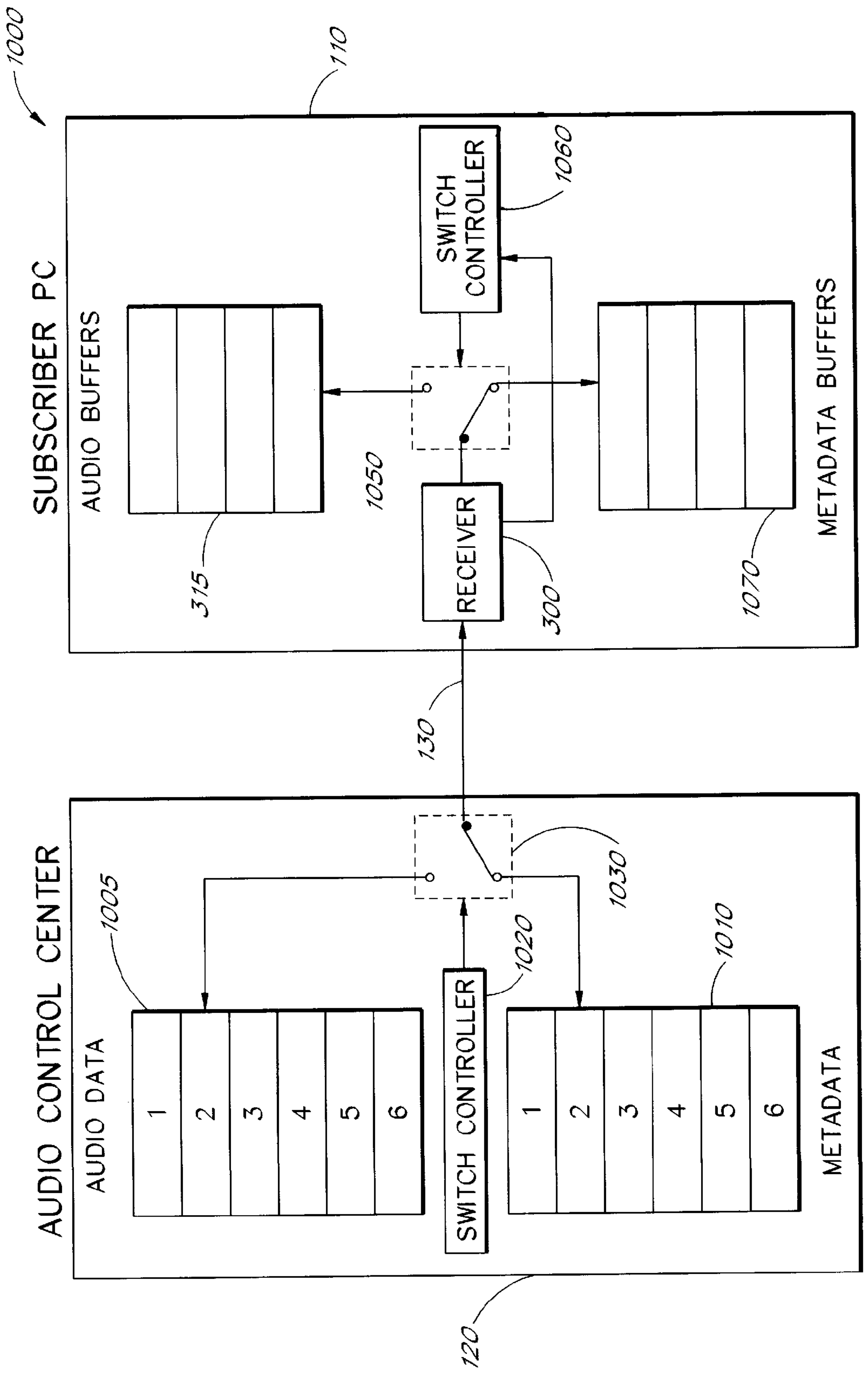
FIG. 10 is a simplified block diagram which depicts the main functional elements of an audio-on-demand system that provides real-time playback of audio data in addition to metadata which can be displayed in synchronism with corresponding audio data.
Figure 11:
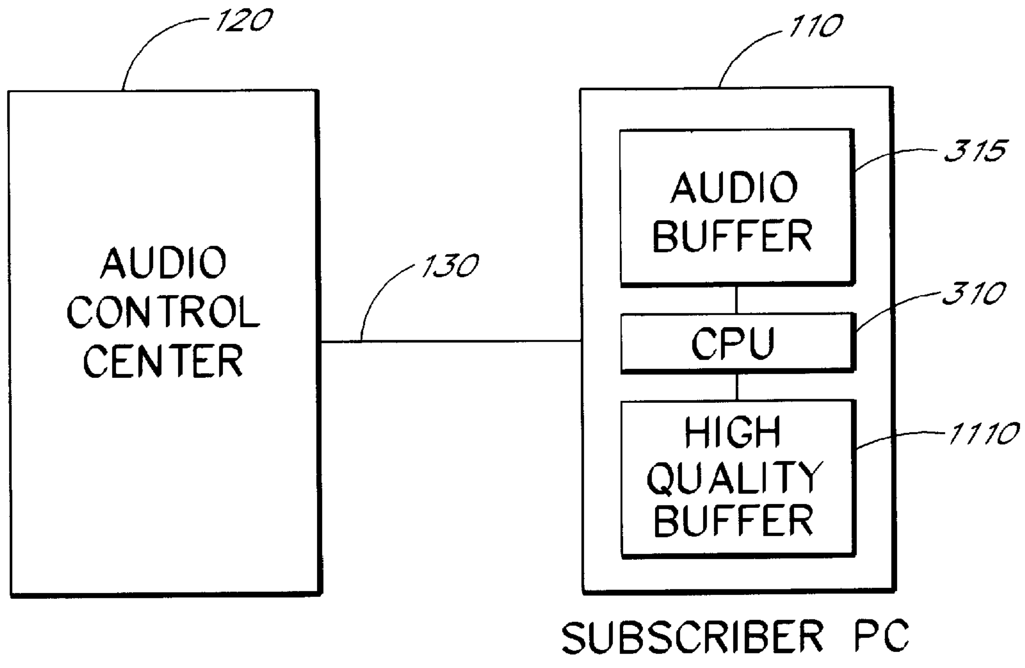
FIG. 11 is a simplified block diagram which depicts the main functional elements of an audio-on-demand system that provides audio playback of selected portions of high quality audio data in real-time.

FIG. 10 is a simplified block diagram which depicts an audio-on-demand system 1000 which is specially adapted to transmit synchronized metadata with audio data. The system 1000 is shown to include the audio control center 120 which is specially adapted to include an audio data file 1005 and a metadata file 1010. Of course, it will be appreciated that, although not shown here, the audio control center 120 also includes the elements depicted in FIG. 2A. A switch controller 1020 controls a high speed switching device 1030 which may, for example, comprise a multiplexer. The output of the switching device 1030 connects to the receiver 300 within the subscriber PC 110 via the communication line 130. It will be understood that the subscriber PC 110 includes the elements depicted in FIG. 3, although many of these elements (e.g., the CPU 310 and the wave driver 330) are not depicted in FIG. 10. As shown in FIG. 10, the subscriber PC 110 is specially adapted to include a high speed switch 1050 which connects to the output of the receiver 300 and which, in one embodiment, may comprise a demultiplexer. The switch 1050 is controlled by a switch controller 1060 which may, for example, be implemented within the CPU 310 (not shown). The switching mechanism 1050 connects alternatively to the audio buffers 315, or to metadata buffers 1070. As with the audio data buffers 315, the metadata buffers 1070 may be allocated as a portion of the DRAM within the subscriber PC 110.

In operation, the audio control center 120 transmits data to the subscriber PC according to the methods described above with reference to FIGS. 1-8. In addition, the audio control center 120 is able to transmit metadata such as text, captions, still images, a table of pertinent statistics, etc., which are synchronized with, and relate to, the transmitted audio data. Thus, for example, while a user is listening to a baseball game, a graphical display may be shown (see the display 895 of FIG. 8A) which indicates the current batter and other pertinent information such as the inning, the count and the score of the game. This data is displayed and updated in synchronism with the transmitted audio data so that the displayed metadata corresponds to the audio data which is currently being played back. Synchronization of the audio data and metadata is advantageously accomplished by time stamping the metadata to be activated at a corresponding time in the audio data transmission. Software running within the CPU 310 advantageously correlates the time stamped metadata with the audio data being played back without requiring ancillary coprocessors.

To accomplish the metadata feature of the present invention, the audio-on-demand system 1000 monitors the quality of the connection between the audio control center 120 and the subscriber PC 110. When a connection of satisfactory quality has been made, the audio control center 120 will begin to transmit interleaved audio and metadata blocks. The audio data blocks are provided by the audio data bank 1005 while the metadata blocks are provided by the metadata bank 1010. The switch 1030 alternately provided audio and metadata over the line 130 so that the audio blocks are interleaved with the metadata blocks in a ratio of, for example, two audio blocks for each metadata block (of course other ratios may be preferable depending upon the specific application and the quality of the connection between the audio control center and the subscriber PC 110).

The subscriber PC 110 receives the transmitted audio data and metadata and selectively stores the audio data within the audio data buffers 315 and the metadata within the metadata buffers 1070. To accomplish selective storing of the audio data and metadata within the appropriate buffers 315, 1070, the switch controller 1060 causes the switch 1050 to switch with the same timing as the switch 1030.

Several methods may be employed to determine if the audio control center 120 should begin transmitting metadata with audio data. In one preferred embodiment, the subscriber PC 110 may wait until the initial ramp-up is complete (i.e., until the audio data buffer 315 has stored at least N data blocks), and then immediately send an EXTRAS OK message to the audio control center 120. The subscriber PC 110 thereafter constantly monitors the audio buffers 315. If the number of audio blocks in the buffers 315 is less than, for example, N/4 then the subscriber PC 110 sends an EXTRAS NO message to the audio control center 120 to indicate that only normal quality audio data and no metadata should be transmitted. When N blocks are again available within the buffer 315, then EXTRAS OK is again transmitted.

In a preferred embodiment, metadata which relates to a selected audio clip is transmitted to the subscriber PC 110 in advance of the time the metadata is actually to be displayed. Typically, metadata for an entire audio clip will comprise a significantly smaller portion of the overall transmitted data than will the audio data for that clip. Thus, the metadata for an entire audio clip may be transmitted, in interleave fashion with the audio data, in the first portion of the clip. By transmitting the metadata in advance, no delays are encountered when displaying the metadata on the display screen 115. This allows the subscriber PC 110 to display the metadata substantially synchronously with a corresponding audio event in the audio clip. To this end, each block of metadata will typically be accompanied by a time stamp as well as a row/column indicator. The time stamp indicates when the metadata is to be displayed during playback of an audio clip (e.g., a caption may be displayed at the 2 minute, 42 and 3 tenths second place in the audio clip). The row/column indicator determines where on the display screen 115 the metadata is to be presented (e.g., the caption may be displayed at the 312th pixel column and the 85th pixel row on the display screen 115).

In addition to transmitting advance metadata in the beginning of an audio clip transmission, metadata may also be transmitted in advance at the occurrence of every seek. When the user initiates a seek, the audio control center 120 transmits audio data from the point of the seek until the subscriber PC 110 sends an EXTRAS OK message (i.e., indicates that metadata is to be sent). The subscriber PC 110 then transmits metadata, interleaved with the audio data, relating to audio to be played back after the point designated by the seek message. Since the metadata advantageously includes a time stamp, it is routine for the server 240 to identify which metadata corresponds to audio data after the location designated by the seek message. In this manner, metadata can be provided without delay so that the metadata occurs substantially simultaneously with corresponding audio data.

According to a still further embodiment of the present invention, connections between proxy servers 260 and subscriber PCs 110 may be dynamically allocated. As is well known in the art, local communication links typically provide higher quality connections for sustained periods than long distance communication links. In accordance with a further aspect of the invention, dynamic allocation of server/subscriber pairs is used to provide improved quality communication links. In one such preferred embodiment, a number of proxy servers 260 (FIG. 2A) are distributed throughout a geographic area. Each subscriber PC 110 is provided with a map (which may be updated periodically) that indicates the locations of the local proxy servers 260. Based upon the geographic location of the subscriber PC 110, the subscriber PC 110 selects a server and establishes communication with that server for future transfers of audio data. In the event that a local proxy server 260 does not have an audio clip requested by a user, the proxy server 260 contacts a central server 240. As the central server 240 downloads the audio data corresponding to the requested audio clip, the proxy server 260 begins transmitting data to the subscriber PC 110 for playback. In a particularly preferred embodiment, the proxy server 260 begins downloading audio data to the subscriber PC 110 even before the proxy server 260 has received the entire audio clip from the central server 240. Thus, the dynamic allocation of server/subscriber pairs provides an improved quality audio data signal in the audio-on-demand system of the present invention.

Figure 12:
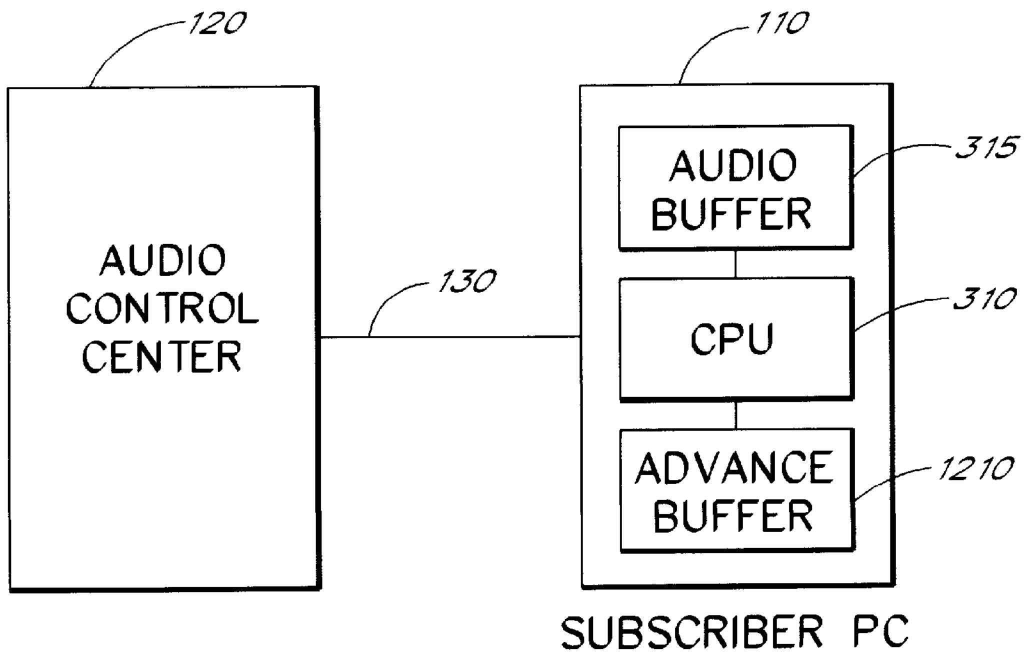
FIG. 12 is a simplified block diagram which depicts the main functional elements of an audio-on-demand system that provides a table of contents indicating significant divisions within a requested audio clip, and which provides for immediate playback of audio data at the divisions specified in the table of contents.

In a still further embodiment of the present invention depicted in FIG. 12, the audio control center 120 may transmit advance data including a visually displayed table of contents. The table of contents indicates significant divisions, or segments, within the requested audio clip (for example, chapters in a book, innings of a baseball game, movements in a sonata). In addition to transmitting the table of contents, the audio control center 120 also transmits a small portion of audio data (e.g., one second worth of audio data) corresponding to the beginning of each division depicted in the table of contents. The table of contents and advance audio data are then stored within a separate advance buffer 1210 as shown in FIG. 12. If the user wishes to access any one of the listed divisions within the requested audio clip, then the user may simply click a mouse button while the mouse pointer is over the listing in the table of contents on the display screen 115. The subscriber PC 110 immediately accesses the advance buffer 1210 to playback the audio data at the selected division. In the meanwhile, the subscriber PC 110 sends a message to the audio control center 120 to transmit additional audio data corresponding to the remainder of the requested audio clip from the selected division. In this manner, the audio-on-demand system of the present invention provides immediate playback of audio when the user selects playback at prespecified portions of the audio clip corresponding to significant divisions within the audio clip.

By way of example, the server 240 could transmit a table of contents indicating the chapters of a book which is being read to a user at the subscriber PC 110. When the user wants to advance to another chapter, the user simply places the mouse pointer over the listed chapter and clicks the mouse button. The server 240 receives this message and immediately begins transmitting data from the newly designated location at the beginning of the selected chapter. In the meantime, the subscriber PC 110 begins playing back the stored audio segment corresponding to the selected chapter. The stored audio segment corresponding to the selected chapter is long enough to allow the buffer 315 to fill up the buffers with a predetermined number of blocks (e.g., the same number of blocks used to fill the buffers at initial ramp-up). Thus, the present invention allows for immediate playback while also minimizing the risk of audio dropouts.

Overall Operation of the Server in Conjunction with the Subscriber

In a preferred embodiment, when a user at the subscriber PC 110 wishes to access audio data on demand, the user logs onto the subscriber PC 110 and selects an "audio-on-demand" option which appears on the video display screen 115 of the subscriber PC 110. Once the user has selected the audio-on-demand option, the subscriber PC 110 initiates a connection with the central server 240 or one of the proxy servers 260. In one preferred embodiment, the subscriber PC 110 may enter information corresponding to the current geographic location of the subscriber PC 110. This feature would be highly advantageous for subscriber PCs implemented as laptop or palmtop computers when the subscriber is travelling. The subscriber PC includes a map indicating the geographic locations of available servers. The subscriber PC 110 advantageously selects one of the available servers based upon the geographic proximity of the available servers to the subscriber PC 110. In another embodiment, the central server 240 may assign a proxy server 260 to the subscriber PC 110 based upon the telephone number the subscriber PC 110 is calling from or information transmitted to the central server from the subscriber PC 110 regarding the subscriber PC's location.

Once communication has been established between the subscriber PC 110 and the selected server 240, 260, the server 240, 260 transmits a menu of audio data clips which may be accessed by the subscriber PC 110. Alternatively, the subscriber PC 110 may contain a prespecified menu of audio data. The menu is then displayed on the video screen 115 so that the user is advantageously able to scroll through the selections available on the menu list using a mouse pointer. The selections could include current radio broadcasts from selected cities, audio books, the audio from classic baseball games, music selections, and a number of other types of audio feeds. When the user finds a selection which is to be played, the user places the mouse pointer over the selection and clicks. The subscriber PC 110 then issues a request message to the server 240, 260 which includes a designation of the selected clip. Upon receiving the request message, the server 240, 260 accesses the requested audio clip within the memory of the server 240, 260. If the selected server is a proxy server 260, and the proxy server 260 does not contain the requested clip in the temporary storage 265, then the proxy server accesses the central server 240 to obtain the requested audio clip from the disk storage 230 or the archival storage 235.

In one advantageous embodiment, the subscriber PC 110 automatically transmits a begin message immediately after transmitting the request message to the server so that the server 240, 260 immediately begins to transmit the audio clip to the subscriber PC 110. In another advantageous embodiment, the subscriber PC 110 waits for the user to select a begin option by clicking the mouse pointer over a begin field on the display screen 115. In either embodiment, the server waits to receive the begin message to begin transmitting blocks of audio data to the subscriber PC 110.

At the beginning of any audio transmission, the server 240, 260 typically transmits a block of information indicating how long (i.e., how many seconds) the audio clip is. This data is displayed on the screen 115.

The flow of data from the server 240, 260 to the subscriber PC 110 may be regulated by means of conventional regulation techniques employed in special communication links such as INTERNET which employs TCP/IP flow regulation. In other advantageous embodiments, the data stream from the server 240, 260 to the subscriber PC 110 includes a plurality of interleaved stop and acknowledge markers. The acknowledge markers precede the stop markers and are spaced at equal intervals from the stop markers. As the server 240, 260 sends data out over the communication link 130, the server determines if a stop marker is detected in the data stream. Once a stop marker is detected, the server 240, 260 temporarily ceases the transmission of data to the subscriber PC 110. The acknowledge and stop markers are spaced so that the subscriber PC 110 will ordinarily receive an acknowledge marker as the server is just about to detect the stop marker. Once the subscriber PC 110 detects the acknowledge marker, the subscriber PC 110 checks to see if it will have enough room in the memory to accept all the data between the next two stop markers. If so, the subscriber PC 110 generates an acknowledge signal and transmits the acknowledge signal back to the server 240, 260. Upon receiving the acknowledge signal, the server 240, 260 continues the transmission of data until the next stop marker is detected. If the subscriber PC finds that it cannot accept the data between the next two stop signals then it will not send the acknowledge signal and the server will stop sending data at the stop signal. In an appropriate server/receiver transmission environment the stop and acknowledge markers could be located in the same position in the data stream and in fact could be a single identical marker.

As audio data is received by the subscriber PC 110, the subscriber PC 110 decompresses the data and loads this data into the wave driver 330 for output to the DAC 338. The DAC 338 outputs the decompressed audio data to a speaker, or other audio transducer such as a hard plane, which plays back the audio data. Thus, for example, a baseball game could be played back at the subscriber PC 110. Additional data (i.e., other than the audio data) is advantageously transmitted to the subscriber PC 1110 from the server 240, 260. In a preferred embodiment, this additional data includes data which may be displayed on the video screen 115 such as the inning of the baseball game, the score, and the current batter. The audio data and the additional data is advantageously accompanied by time stamp information so that the additional data can be synchronously displayed with corresponding audio data.

Throughout the transmission, the user is presented with several options including an option to pause audio playback, an option to seek a new portion of the audio clip, an option to end transmission of the audio clip, etc. Each of these options may be selected by the user by means of the mouse pointer. The selection of any option causes a corresponding message to be sent to the server 240, 260 indicating the selected option. The server 240, 260 then responds in the appropriate manner.

Finally, the user may end the connection with the server 240, 260 by activating a disconnect filed on the display screen 115 by means of the mouse pointer.

Although the preferred embodiment of the present invention has been described and illustrated above, those skilled in the art will appreciate that various changes and modifications to the present invention do not depart from the spirit of the invention. Accordingly, the scope of the present invention is limited only by the scope of the following appended claims.

What is claimed is:

1. A client networked device for connection with one or more remote computers providing delivery of digital encoded audio data and related video via a communication network, said related video is synchronized with said digital encoded audio data, the client networked device comprising:

a first and a second data buffer to store the digital encoded audio data and related video, respectively; and a processor communicatively coupled with the data buffers and a computer readable storage medium; said computer-readable storage medium operative to contain one or more unique file identifiers related to one or more locations or addresses in a memory of the one or more remote computers where the digital encoded audio data and related video is stored, information corresponding to said unique file identifiers being capable of being displayed by the client networked device and of being selected using an input device coupled to the client networked device, said processor operative in response to a selection of a unique file identifier to generate a request via the communication network to receive digital encoded audio data and related video from the one or more locations or addresses in the memory of the one or more remote computers where said digital encoded audio data and related video is stored, said data buffers operative, in response to a receipt of the request to receive digital encoded audio data and related video from the one or more locations or addresses in the memory of the one or more remote computers, to store digital encoded audio data and the related video received via the communication network, and said processor further operative to decode the received digital encoded audio data and related video and render said decoded digital audio data and related video on the client networked device during receipt of at least the digital encoded audio data, and wherein said processor is operative to selectively initiate transmission of at least one indication to the remote server via the network in response to at least one marker identified in the received digital encoded audio data to regulate a rate at which the digital encoded audio data is received, the at least one marker having been interleaved in the received digital encoded audio data.

2. The client network device as recited in claim 1 wherein said digital encoded audio data includes streamed audio data, and wherein said streamed audio data is received by one of the data buffers via the communications network in a packetized format.

3. The client network device as recited in claim 2 wherein the digital encoded audio data is encoded using compression; and wherein the digital encoded audio is decoded and decompressed using a random access memory coupled with the client networked device.

4. The client network device as recited in claim 1 wherein said video is rendered by the processor on the client networked device while said decoded digital audio data is rendered.

5. The client network device as recited in claim 1 wherein said digital encoded audio data includes a compressed audio data file that is stored on said one or more remote computers.

6. The client network device as recited in claim 1 wherein said selected unique file identifier facilitates access to one or more locations within the memory of the one or more remote computers and wherein the memory is a computer-readable storage medium.

7. The client network device as recited in claim 1 wherein said unique file identifier includes an address representing a location of said digital encoded audio data, and wherein said unique file identifier is received into a memory of the client networked device from a remote server having a different network address from the one or more remote computers.

8. The client network device as recited in claim 1 further comprising a menu stored on the computer-readable storage medium operative to indicate addresses of a plurality of digital encoded audio where audio data is stored on the one or more remote computers, and a module operative to receive a signal from the input device to change an indication of the one or more addresses of the plurality of digital encoded audio data.

9. The client network device as recited in claim 1 wherein the video data is received within one of the data buffers via the communications network in a packetized format.

10. The client network device as recited in claim 1 wherein the first and second data buffers for receiving the digital encoded audio data and related video are defined within the computer readable storage medium.

11. The client network device as recited in claim 10 wherein the first data buffer is defined within a first range of memory addresses within the computer readable storage medium and the second data buffer is defined within a second range of memory addresses within the computer readable storage medium.

12. The client network device as recited in claim 1, wherein the digital encoded audio data is received from a first of the one or more remote computers and the related video is received from a second of the one or more remote computers.

13. A method of receiving a digital encoded audio data files for use on a client networked device coupled with one or more remote computers delivering digital encoded audio data file and related video via a communications network, said related video is synchronized to said digital encoded audio data, the method comprising:

displaying on the client networked device information related to a unique file identifier used to access:

(a) a location or address where the digital encoded audio data file is stored in a memory storage device coupled with the one or more remote computers, and (b) a location or address where the related video is stored in a memory storage device coupled with the one or more remote computers;

receiving a selection of the displayed information relating to the unique file identifier used to access a location or address where the digital encoded audio data file is stored and used to access a location or address where the related video is stored in the memory storage device coupled with the one or more remote computers in response to a signal from an input device coupled with the client networked device;

generating on the client networked device, as a result of the receiving of the selection of the information relating to the displayed unique file identifier, a request to the one or more remote computers via the communications network to receive the digital encoded audio file and related video from said location or address where the digital encoded audio data file is stored in the memory storage device coupled with the one or more remote computers an from said location or address where the related video is stored in the memory storage device coupled with the one or more remote computers;

receiving by the client networked device, as a result of the generated request, via the communications network:

(a) the digital encoded audio data file from said location or address where the digital encoded audio data file is stored in the memory storage device coupled with the one or more remote computers, and (b) the related video from said location or address where the related video is stored in the memory storage device coupled with the one or more remote computers; storing at least a portion of the digital encoded audio data file and related video respectively into a first and second data buffer; decoding at least a portion of the stored digital encoded audio data file and rendering at least a portion of the decoded stored digital encoded audio data file on the client networked device during the receiving of the digital encoded audio data file from said location or address where the digital encoded audio data file is stored in the memory storage device coupled with the one or more remote computers; and regulating a rate at which the digital encoded audio data file is received from a remote server by selectively transmitting at least one indication to the remote server via the communications network in response to at least one marker identified in the digital encoded audio data file, the at least one marker having been interleaved in the digital encoded audio data file.

14. The method of receiving digital encoded audio data file as recited in claim 13 further comprising receiving the video data within one of the data buffers via the communications network in a packetized format.

15. The method of receiving digital encoded audio data file as recited in claim 14 further comprising receiving the digital audio data file that was encoded using compression;

storing the digital encoded audio within a random access memory coupled with the client networked device; and decoding the stored digital encoded audio using decompression.

16. The method of receiving digital encoded audio data file as recited in claim 13 further comprising including streamed audio data with the digital encoded audio data, and receiving the streamed audio data within one of the data buffers via the communications network in a packetized format.

17. The method of receiving digital encoded audio data file as recited in claim 13 wherein said digital encoded audio data file includes compressed audio data file;

storing the compressed audio data file and the video on the client networked device; and rendering the video on the client networked device while receiving the digital encoded audio data file.

18. The method of receiving digital encoded audio data file as recited in claim 13 further comprising relating said unique file identifier to a location on the one or more remote computers by using the unique file identifier to access the locations within the memory of the one or more remote computers, and using a computer-readable storage device as the memory on the one or more remote computers.

19. The method of receiving digital encoded audio data file as recited in claim 13 further comprising receiving the unique file identifier and information related thereto from a remote networked server having a different network address from the one or more remote computers, and storing said unique file identifier into a memory of the client networked device upon receipt thereof.

20. The method of receiving digital encoded audio data file as recited in claim 13 further comprising storing, on the computer-readable storage device of the client networked device, a menu of information corresponding to multiple unique file identifiers used to indicate addresses of a plurality of digital encoded audio where audio data is stored on the one or more remote computers, receiving on the client networked device a signal from the input device, and changing a display of the information corresponding to the multiple unique file identifier used to access the addresses of the plurality of digital encoded audio files in response to receipt of the signal.

21. The method of receiving digital encoded audio data file as recited in claim 13 further comprising rendering the encoded audio data file by decoding the digitally encoded data file using an audio driver stored in a memory on the client networked device while the digital encoded audio data file is being received from the one or more remote computers.

22. The method of receiving digital encoded audio data file as recited in claim 13, wherein the first and second data buffers are defined within a memory storage device coupled to the client networked device.

23. The method of receiving digital encoded audio data file as recited in claim 22 wherein the first data buffer is defined within a first range of memory addresses within the memory storage device and the second data buffer is defined within a second range of memory addresses within the memory storage device.

24. The method of receiving digital encoded audio data file as recited in claim 22, wherein the digital encoded audio data file and related video are received into the first and second data buffers, respectively.

25. The method of receiving digital encoded audio data file as recited in claim 13, wherein the digital encoded audio data is received from a first of the one or more remote computers and the related video is received from a second of the one or more remote computers.

26. A computer readable medium having instructions for use in a single media player application, the instructions when executed by a processor in a client networked device, for receiving digital encoded audio data and related video via a communication network, said related video is synchronized with said digital encoded audio data, the client networked device comprising:

displaying on the client networked device information corresponding to a unique file identifier related to one or more locations or addresses where digital encoded audio data and related video are stored in a memory storage device coupled with one or more remote computers;

receiving a selection of the displayed information corresponding to the unique file identifier related to the one or more locations or addresses where the digital encoded audio data and related video are stored in the memory storage device coupled with the one or more remote computers, the selection received via an input device coupled with the client networked device;

generating on the client networked device, as a result of the receipt of the selection of the displayed information, a request to at least one of the remote computers via a communications network to receive digital encoded audio and related video from said one or more locations or addresses where the digital encoded audio data and related video is stored in the memory storage device coupled with the one or more remote computers;

receiving by the client networked device, as a result of the generated request and via the communications network, the digital encoded audio data and related video from said one or more locations or addresses in the memory storage device coupled with the one or more remote computers;

storing at least a portion of the received digital encoded audio data and related video respectively into a first and second data buffer;

decoding at least a portion of the stored digital encoded audio data and rendering at least a portion of the decoded and stored digital encoded audio data and related video on the client networked device during the receiving of the digital encoded audio data from said one or more locations or addresses where the digital encoded audio data is stored in the memory storage device coupled with the one or more remote computers; and regulating a rate at which the digital encoded audio data file is received from a remote server by selectively transmitting at least one indication to the remote server via the communications network in response to at least one marker identified in the digital encoded audio data file, the at least one marker having been interleaved in the digital encoded audio data file.

27. The computer readable medium having instructions for use in a single media player application as recited in claim 26, wherein the instructions when executed by a processor in a client networked device further comprise receiving the video data within one of the data buffers via the communications network in a packetized format.

28. The computer readable medium having instructions for use in a single media player application as recited in claim 26, wherein the instructions when executed by a processor in a client networked device further comprise: including video data with the digital encoded audio data, and receiving the video data within one of the data buffers via the communications network in a packetized format.

29. The computer readable medium having instructions for use in a single media player application as recited in claim 26, wherein the instructions when executed by a processor in a client networked device further comprise: including streamed audio data with the digital encoded audio data, and receiving the streamed audio data within one of the data buffers via the communications network in a packetized format.

30. The computer readable medium having instructions for use in a single media player application as recited in claim 26, wherein the instructions when executed by a processor in a client networked device further comprise: including with said digital encoded audio data a compressed audio data file; and storing compressed audio data files with related metadata on the one or more remote computers.

31. The computer readable medium having instructions for use in a single media player application as recited in claim 26, wherein the instructions when executed by a processor in a client networked device further comprise:

relating said unique file identifier to a location on the one or more remote computers by using the unique file identifier to access the locations within the memory of the one or more remote computers, and using a computer-readable storage device as the memory on the one or more remote computers.

32. The computer readable medium having instructions for use in a single media player application as recited in claim 26, wherein the instructions when executed by a processor in the client networked device further comprise:

receiving into the client networked device via the communication network, the unique file identifier and information related thereto from a remote networked server having a different network address from the one or more remote computers, and storing said unique file identifier into the memory of the client networked device upon receipt thereof.

33. The computer readable medium having instructions for use in a single media player application as recited in claim 26, wherein the instructions when executed by a processor in a client networked device further comprise:

storing a menu of information relating to the multiple unique file identifiers used to indicate addresses of a plurality of digital encoded audio data where audio data is stored on the one or more remote computers;

receiving on the client networked device a signal from the input device; and changing a display of the information relating to the multiple unique file identifiers that are used to access the addresses of the plurality of digital encoded audio files in response to receipt of the signal.

34. The computer readable medium having instructions for use in a single media player application as recited in claim 26, wherein the instructions when executed by a processor in a client networked device further comprise decoding the digital encoded audio data using decompression with a random access memory coupled with the client networked device.

35. The computer readable medium having instructions for use in a single media player application as recited in claim 26, wherein the instructions when executed by a processor in a client networked device further comprise:

rendering the digital encoded audio data file by decoding the digital encoded data file using an audio and/or video driver stored in a memory on the client networked device while the digital encoded audio data file is being received from the one or more remote computers.

36. The computer readable medium having instructions for use in a single media player application as recited in claim 26, wherein the first and second data buffers are defined within a memory storage device coupled to the client networked device.

37. The computer readable medium having instructions for use in a single media player application as recited in claim 36, wherein the first data buffer is defined within a first range of memory addresses within the memory storage device and the second data buffer is defined within a second range of memory addresses within the memory storage device.

38. The computer readable medium having instructions for use in a single media player application as recited in claim 36, wherein the digital encoded audio data file and related metadata are received into the first and second data buffers, respectively.

39. The computer readable medium having instructions for use in a single media player application as recited in claim 26, wherein the digital encoded audio data is received from a first of the one or more remote computers and the related video is received from a second of the one or more remote computers.

40. A method of delivering from one or more remote computers digital via a communications network encoded audio data files and related metadata for use on a client networked device coupled with the one or more remote computers, said related metadata being synchronized to said digital encoded audio data, the method comprising:

transmitting a unique file identifier used to access:

(a) a location or address where the digital encoded audio data file is stored in a memory storage device coupled with the one or more remote computers, and (b) a location or address where the related metadata is stored in a memory storage device coupled with the one or more remote computers;

transmitting for display on the client networked device information relating to the unique file identifier;

receiving from the client networked device with the one or more remote computers via the communications network, as a result of the client network device receiving of a selection of the information relating to the displayed unique file identifier from a input device coupled with the client network device, a request to receive the digital encoded audio file from said location or address where the digital encoded audio data file is stored in the memory storage device coupled with the one or more remote computers and related metadata from said location or address where the related metadata is stored in the memory storage device coupled with the one or more remote computers;

transmitting to the client networked device, as a result of the generated request, via the communications network:

(a) the digital encoded audio data file from said location or address where the digital encoded audio data file is stored in the memory storage device coupled with the one or more remote computers, wherein the transmitted digital encoded audio file comprises at least one marker interleaved therein, and (b) the related metadata from said location or address where the related metadata is stored in the memory storage device coupled with the one or more remote computers, such that a portion of the digital encoded audio data file and related metadata are stored respectively into a first and second data buffers in the client networked device and such that at least a portion of the stored digital encoded audio data file is decoded and rendered on the client networked device during the receiving of the digital encoded audio data file from said location or address where the digital encoded audio data file is stored in the memory storage device coupled with the one or more remote computers; and receiving an indication from the client networked device via the network to regulate a rate at which the digital encoded audio data file is transmitted, the indication being a response to the marker in the transmitted digital encoded audio data file.

41. The method of delivering encoded audio data files and related metadata as recited in claim 40 further comprising transmitting the digital encoded audio data from a first of the one or more remote computers and transmitting the related metadata from a second of the one or more remote computers.

42. The method of delivering encoded audio data files and related metadata as recited in claim 40 further comprising transmitting for storage on a memory of the client networked device, a menu of information corresponding to multiple unique file identifiers used to indicate addresses of a plurality of digital encoded audio where audio data is stored on the one or more remote computers, receiving an indication of a signal transmitted to the client networked device from the input device, and transmitting information to change a display of the information corresponding to the multiple unique file identifier used to access the addresses of the plurality of digital encoded audio files in response to receipt of the signal.

43. The method as recited in claim 40 wherein metadata includes timestamps, text, video, pictures, index information, or encoding information.

44. The method of claim 1, wherein said rate comprises a content rate.

45. The method of claim 1, wherein said rate comprises a transmission rate.

46. The method of claim 13, wherein said rate comprises a content rate.

47. The method of claim 13, wherein said rate comprises a transmission rate.

48. The method of claim 26, wherein said rate comprises a content rate.

49. The method of claim 26, wherein said rate comprises a transmission rate.

50. The method of claim 40, wherein said rate comprises a content rate.

51. The method of claim 40, wherein said rate comprises a transmission rate.

* * * * *